INVENTOR.
Karl J. Braun
BY
ATTORNEY

July 31, 1951      K. J. BRAUN      2,562,232
CARD ANALYZER AND PRINTING MEANS IN A TABULATOR
Filed Feb. 27, 1947      14 Sheets-Sheet 3

INVENTOR.
Karl J. Braun
BY
Edward L. Mueller
ATTORNEY

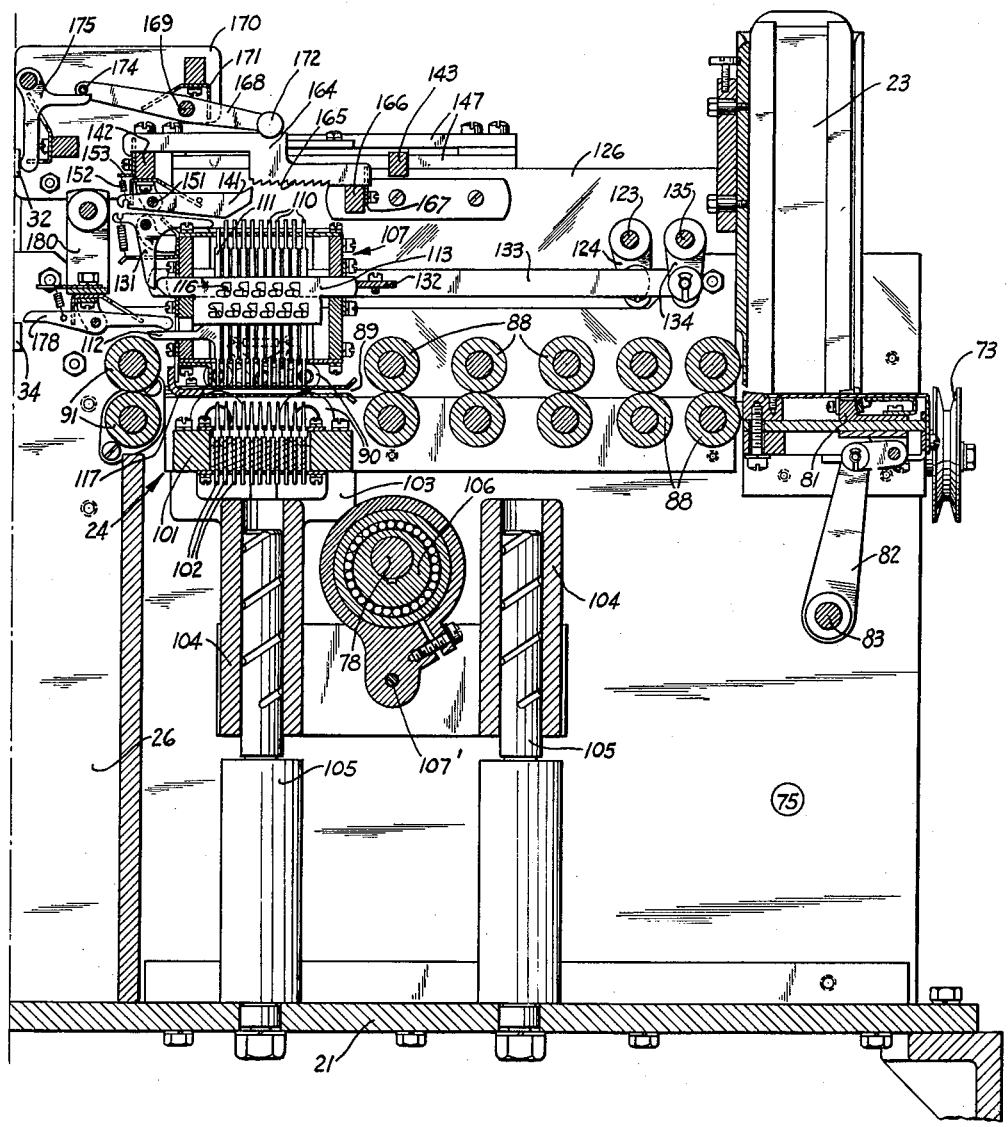

July 31, 1951  K. J. BRAUN  2,562,232
CARD ANALYZER AND PRINTING MEANS IN A TABULATOR
Filed Feb. 27, 1947  14 Sheets-Sheet 6

INVENTOR.
Karl J. Braun
BY
Edward L. Mueller
ATTORNEY

July 31, 1951 K. J. BRAUN 2,562,232
CARD ANALYZER AND PRINTING MEANS IN A TABULATOR
Filed Feb. 27, 1947 14 Sheets-Sheet 9
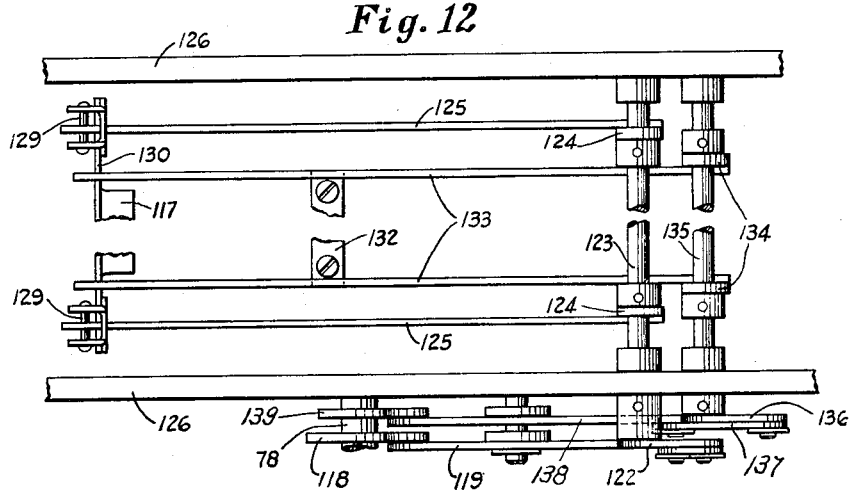
Fig. 12
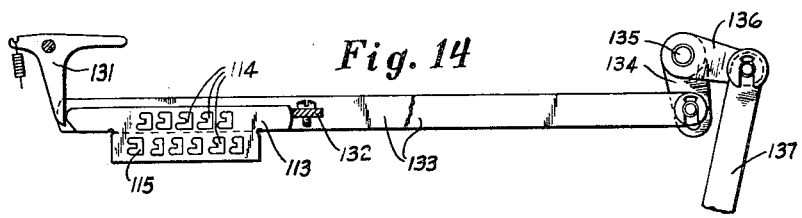
Fig. 14
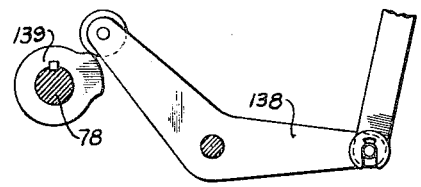
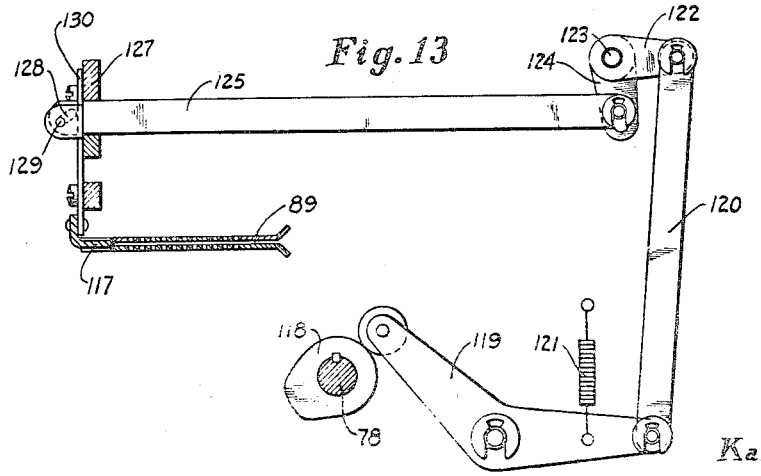
Fig. 13
INVENTOR.
Karl J. Braun
BY
ATTORNEY July 31, 1951        K. J. BRAUN        2,562,232
CARD ANALYZER AND PRINTING MEANS IN A TABULATOR
Filed Feb. 27, 1947        14 Sheets-Sheet 10
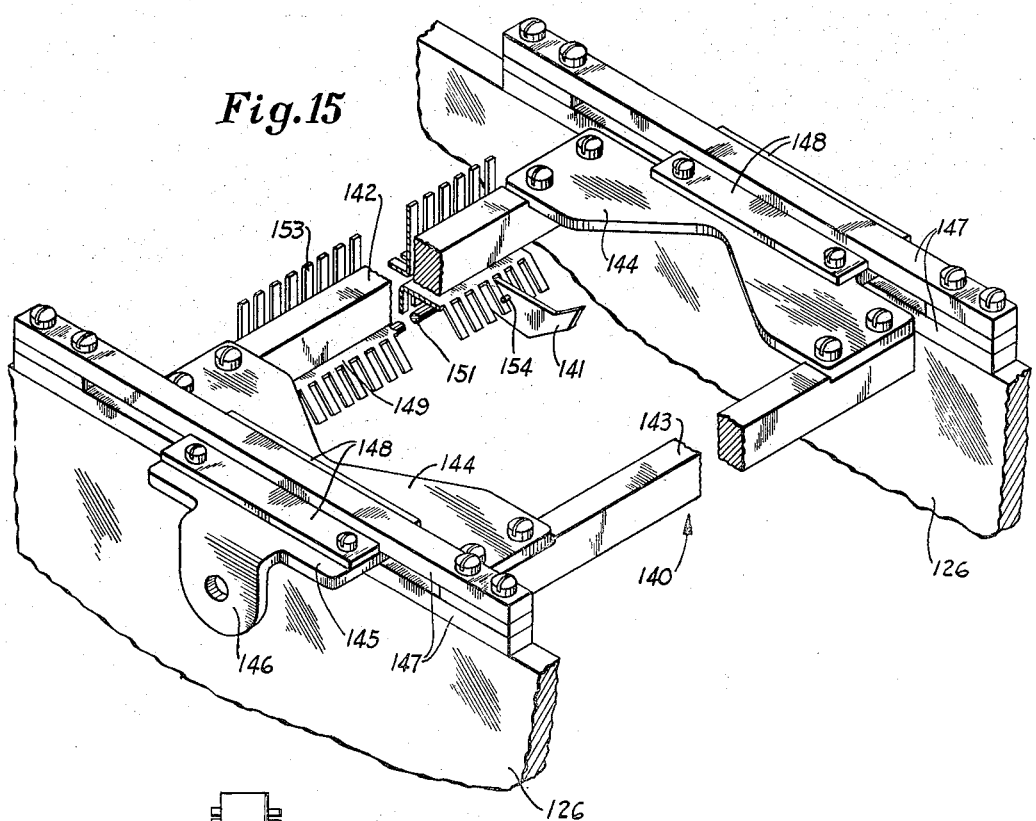
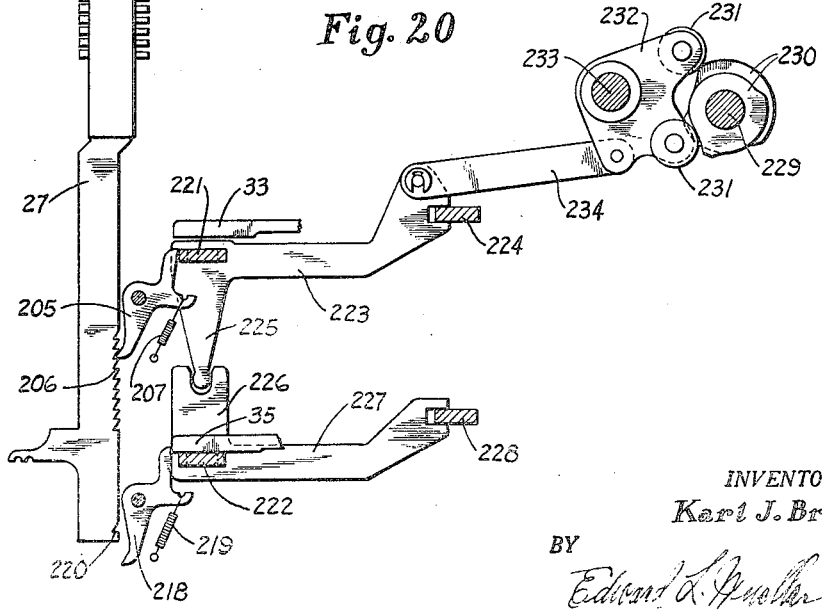
INVENTOR.
Karl J. Braun
BY
ATTORNEY

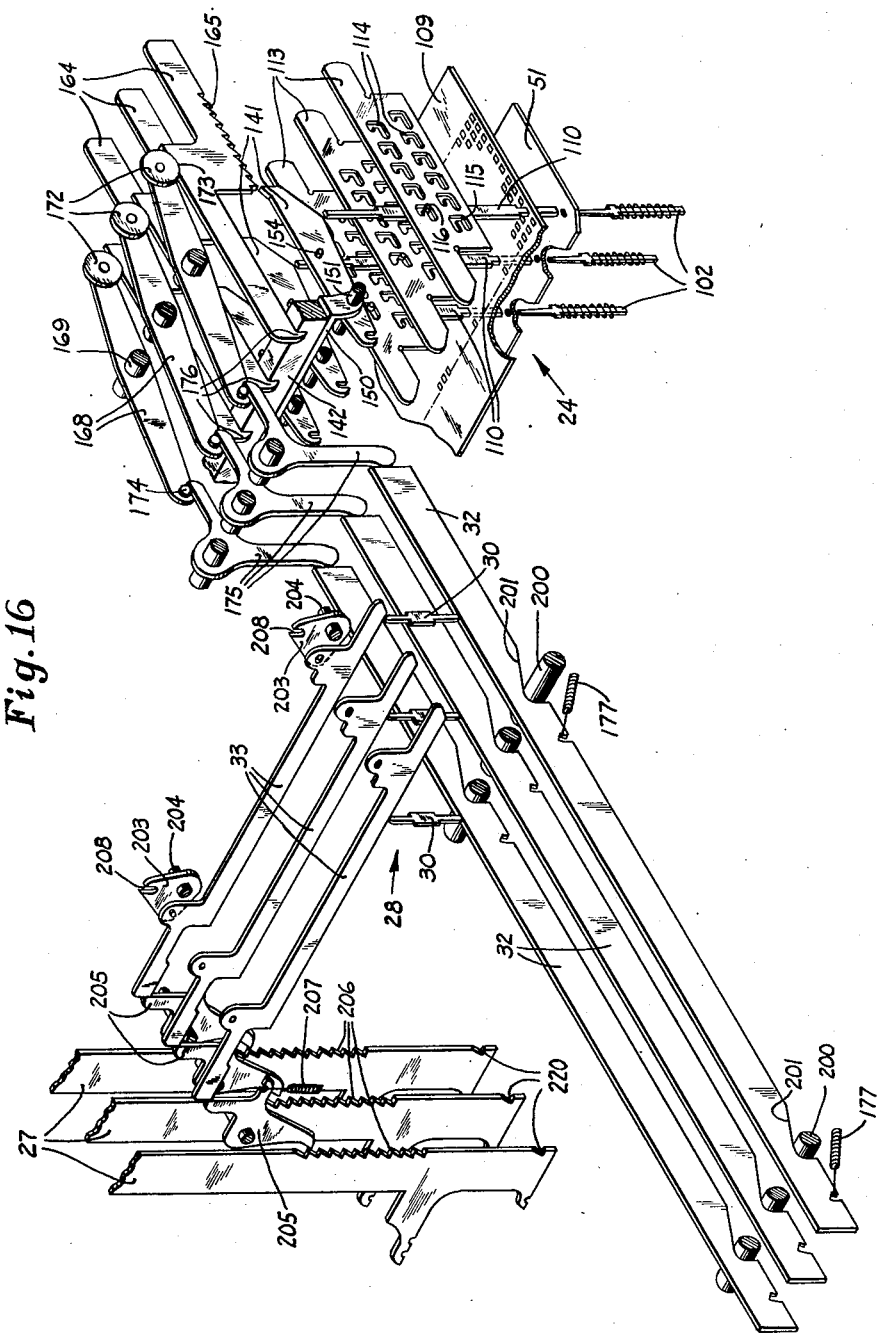

July 31, 1951 K. J. BRAUN 2,562,232
CARD ANALYZER AND PRINTING MEANS IN A TABULATOR
Filed Feb. 27, 1947 14 Sheets-Sheet 12

INVENTOR.
Karl J. Braun
BY
*Edward L. Mueller*
ATTORNEY

July 31, 1951 K. J. BRAUN 2,562,232
CARD ANALYZER AND PRINTING MEANS IN A TABULATOR
Filed Feb. 27, 1947 14 Sheets-Sheet 13

INVENTOR.
Karl J. Braun
BY
*Edward L. Mueller*
ATTORNEY

July 31, 1951 K. J. BRAUN 2,562,232
CARD ANALYZER AND PRINTING MEANS IN A TABULATOR
Filed Feb. 27, 1947 14 Sheets-Sheet 14

INVENTOR.
Karl J. Braun
BY
Edward L. Mueller
ATTORNEY

Patented July 31, 1951

2,562,232

UNITED STATES PATENT OFFICE 2,562,232

CARD ANALYZER AND PRINTING MEANS IN A TABULATOR

Karl J. Braun, Glenbrook, Conn., assignor to Control Instrument Company, Inc., Brooklyn, N. Y., a corporation of New York Application February 27, 1947, Serial No. 731,388

23 Claims. (Cl. 101—93)

This invention relates to improvements in statistical card controlled machines and has particular reference to a tabulator.

Generally, tabulating machines of the type with which the present invention is concerned have analyzers which operate upon cards bearing index points arranged in columns and denoting different identifying data. These index points are punched in various locations in the columns to represent data which is read by the analyzer and then transmitted to various recording members such as printing devices, accumulators, and other like instrumentalities that are operated to print said data on a report sheet.

For brevity and clarity of disclosure, the present invention is illustrated in connection with a machine which will control a group of recording members, such as type bars, to print data transmitted thereto in accordance with the analysis of the cards which are fed through the analyzer, but it will be understood that said invention is adaptable to a machine embodying other recording instrumentalities and totalizing means, and features of automatic group control effected upon changes of designation in the cards.

In accordance with the present invention, it is proposed to greatly simplify the translation of analyzed data taken from the record cards fed to the machine and the transmission of said data from the analyzer to a plurality of recording members, by the provision of one or more novel transfer units and associated control mechanisms which will afford maximum flexibility in the group selection and control of said recording members.

More specifically, and in conformity with the foregoing proposal, a transfer unit is provided which is capable of being readily removed from and replaced in the machine and, when so removed, may have its transmission characteristics altered by the interchangeable or selective positioning of a plurality of settable transfer elements, preferably in the form of pins, in such manner that data read from the various columns of a card may be transmitted to any selected one or more groups of said recording members.

A further feature of the invention is to utilize a transfer unit having the above mentioned characteristics for the purpose of transmitting data in any two or more different fields of cards being analyzed to the same group of recording members or type bars.

A still further feature resides in the employment of two separately controlled transfer units for accomplishing the selection of groups of recording members and the arbitrary elimination or suppression of any one or more of said groups, as desired.

The inventive idea is capable of receiving a variety of mechanical expressions one of which, for purposes of illustration, is shown in the accompanying drawings; but it is to be expressly understood that said drawings are employed merely to facilitate the description of the invention as a whole and not to define the limits thereof, reference being had to the appended claims for this purpose.

Figure 8:
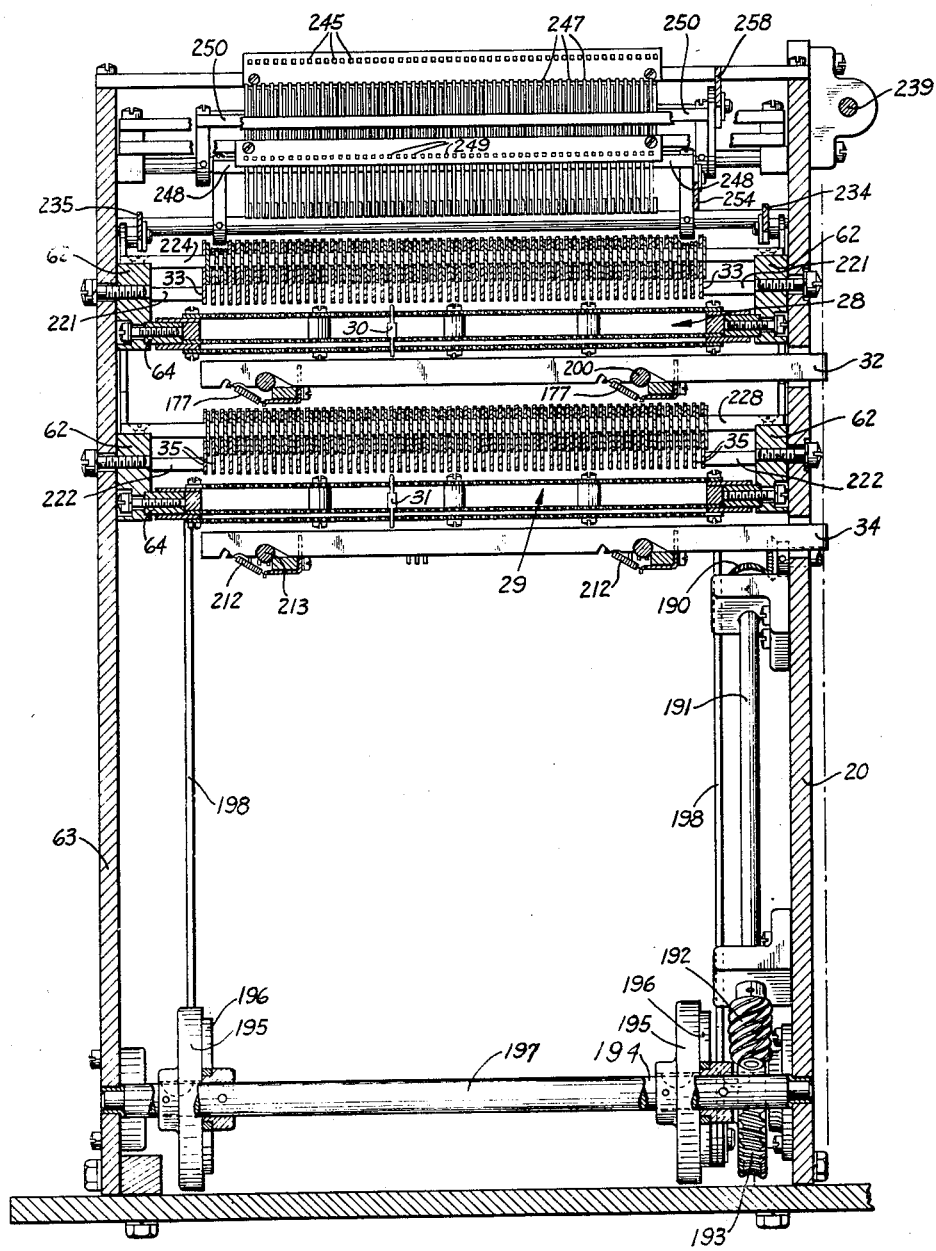

Figs. 7 and 8, when arranged side by side with Fig. 8 on the left, combine to illustrate a vertical longitudinal section through the machine.

Figure 9:
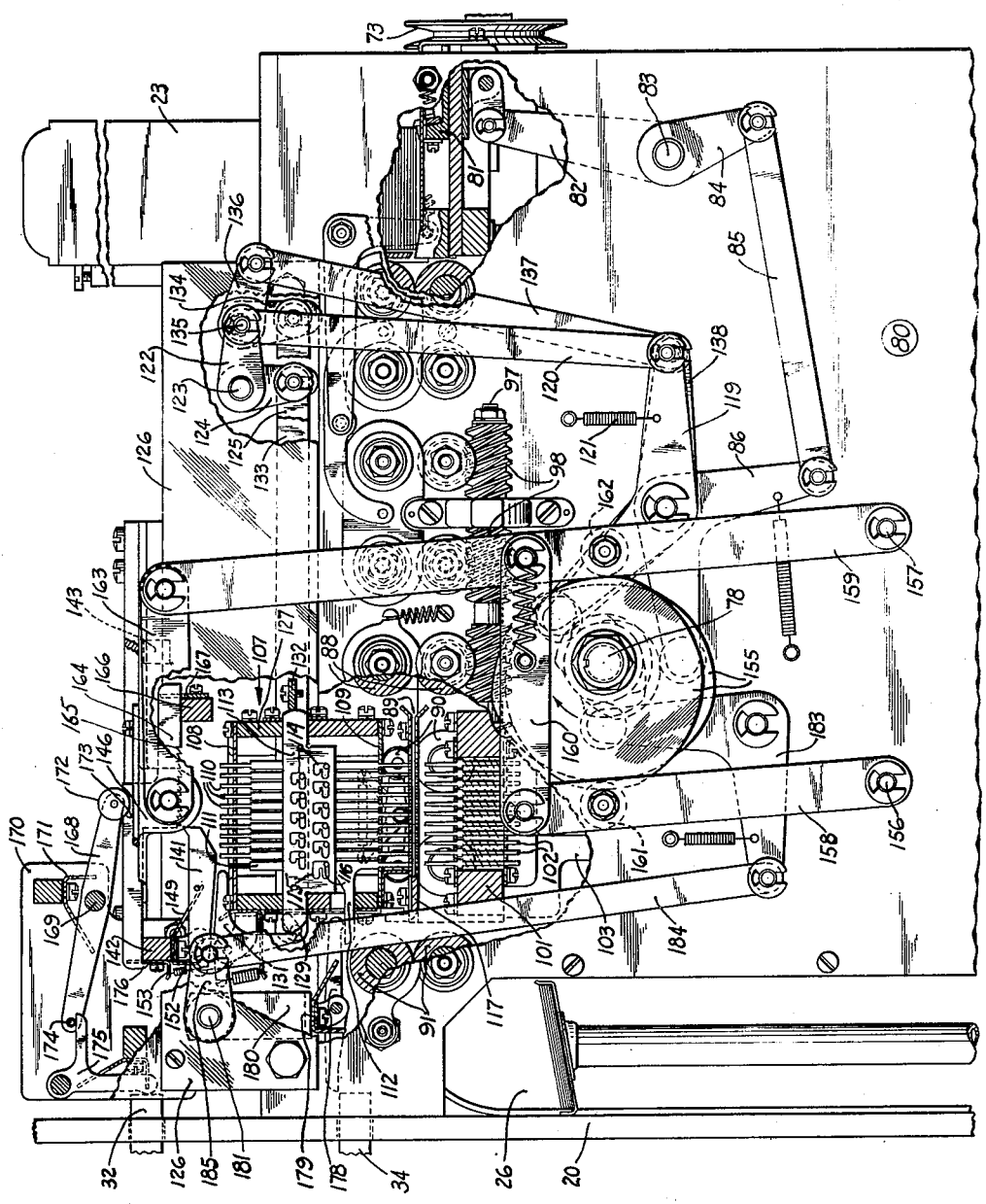

Fig. 9 is an enlarged front elevation, partly broken away and shown in section, of the analyzing section of the machine together with associated mechanisms controlled thereby.

Figure 10:
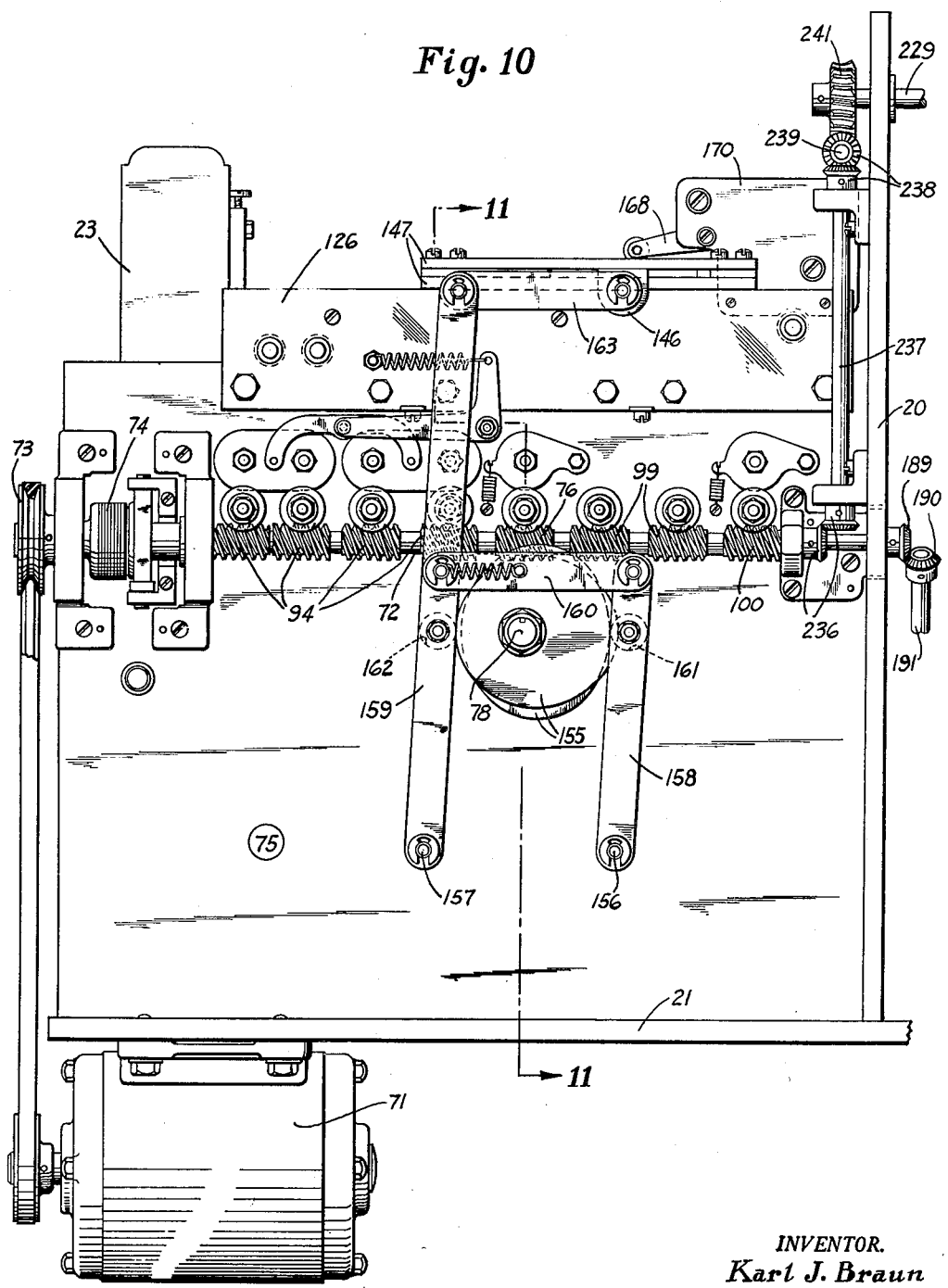

Fig. 10 is a rear elevation of the portion of the machine shown in Fig. 9, and further illustrating certain driving connections between the analyzing and tabulating sections.

Figure 11:
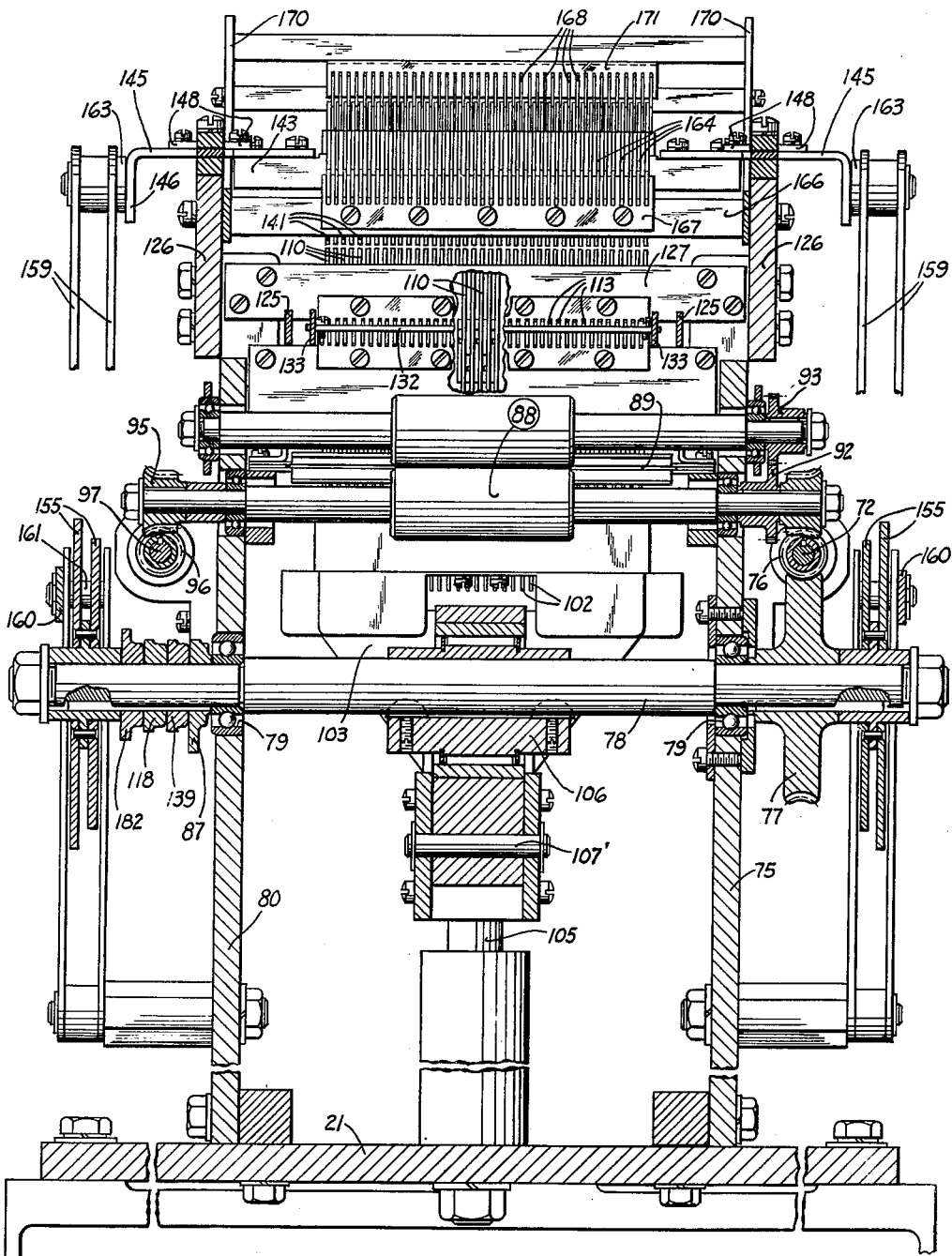

Fig. 11 is an enlarged transverse sectional view taken substantially on the line 11—11 of Fig. 10.

Fig. 12 is a fragmentary top plan view showing the operating mechanisms for the analyzer card stop and the lock plates forming part of the upper pin box illustrated in Figs. 7 and 9.

Fig. 13 is a detail view showing a side elevation, partly in section, of the mechanism controlling the card stop.

Fig. 14 is a similar view of the lock plate control.

Fig. 15 is a fragmentary perspective view of the scanning device which cooperates with the card analyzer.

Fig. 16 is a fragmentary isometric view of the upper transfer unit and associated parts.

Figure 17:
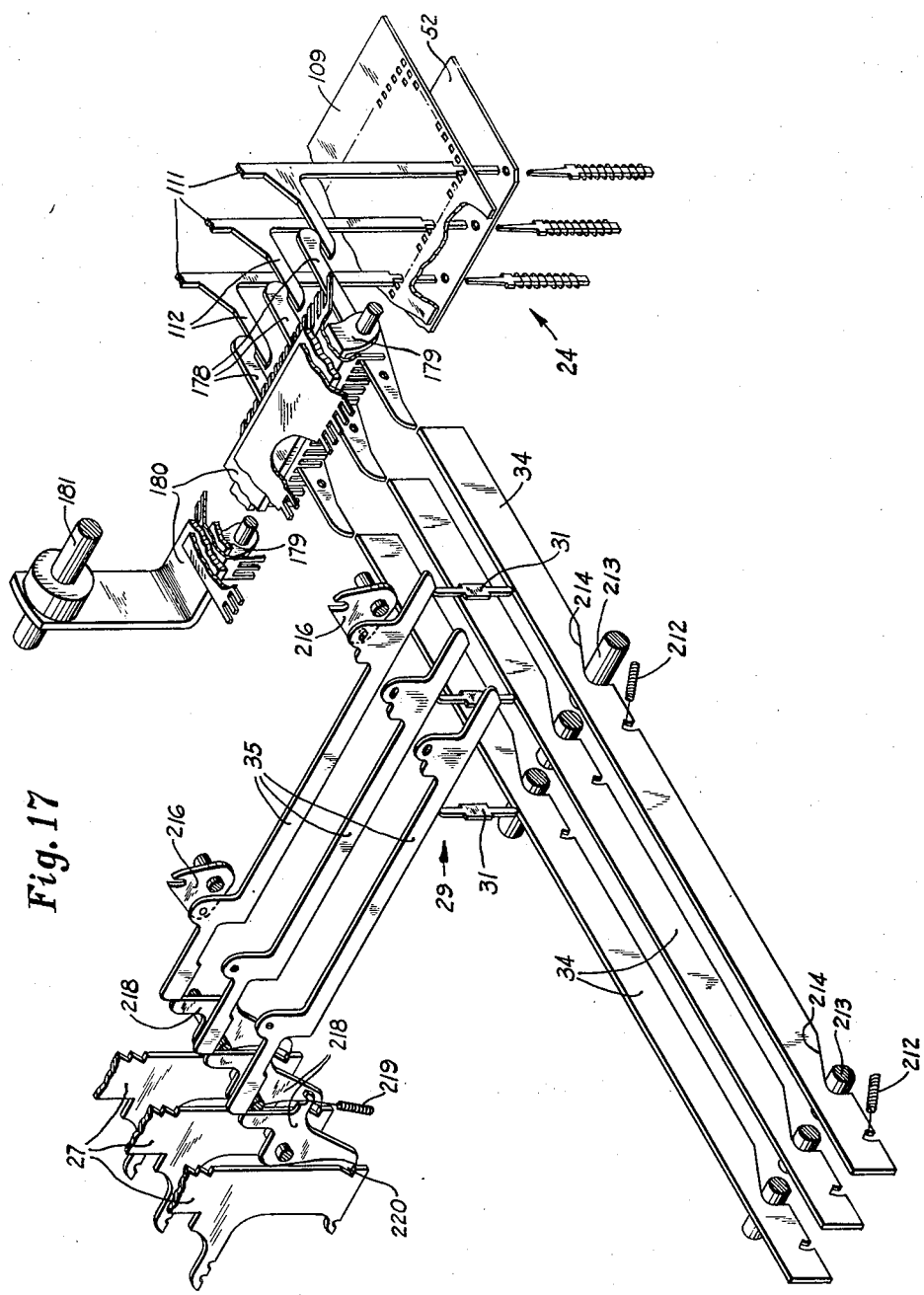

Fig. 17 is a similar view of the lower transfer unit.

Figure 18:
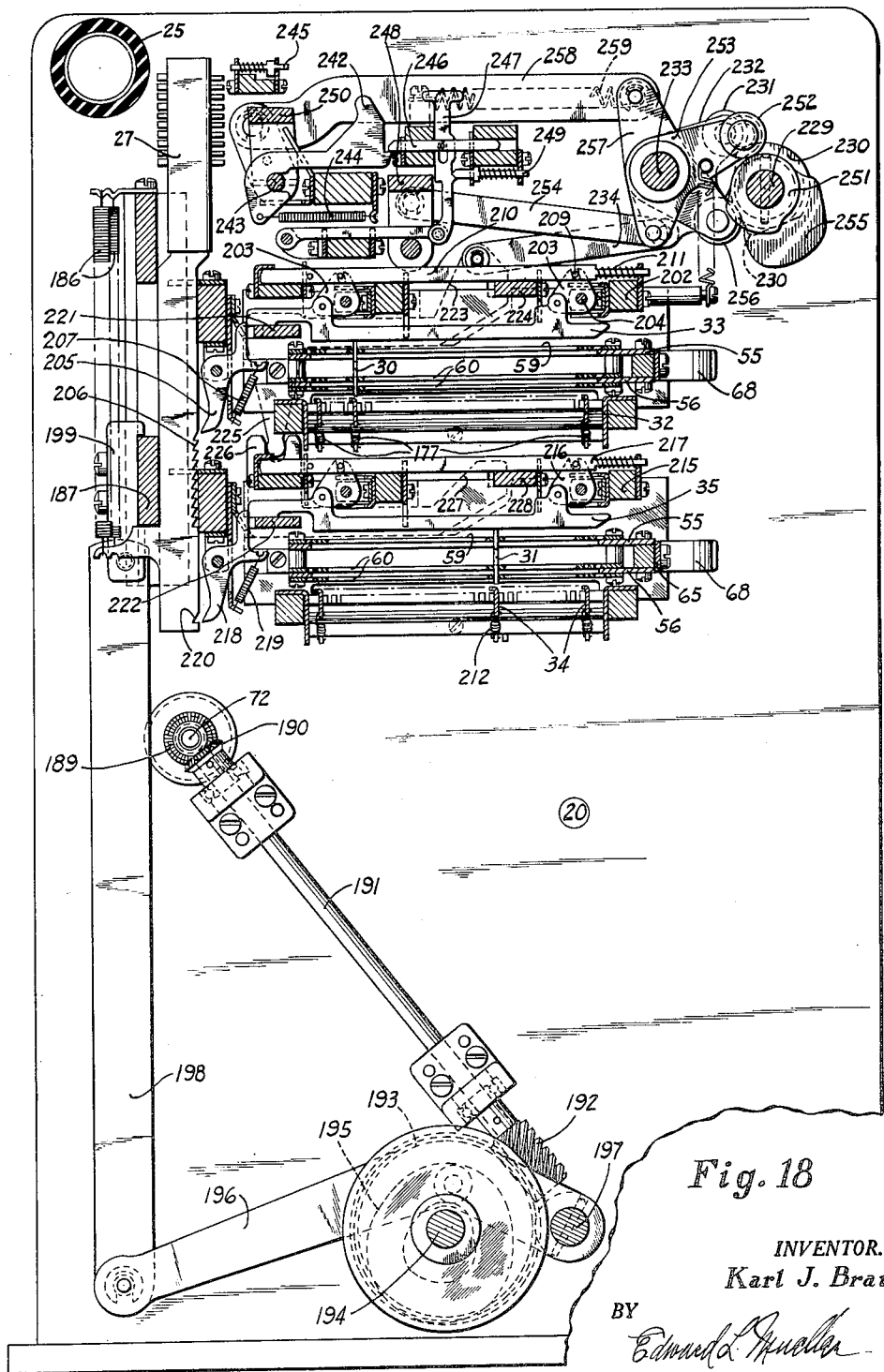

Fig. 18 is a vertical transverse section through the tabulating portion of the machine.

Figure 19:
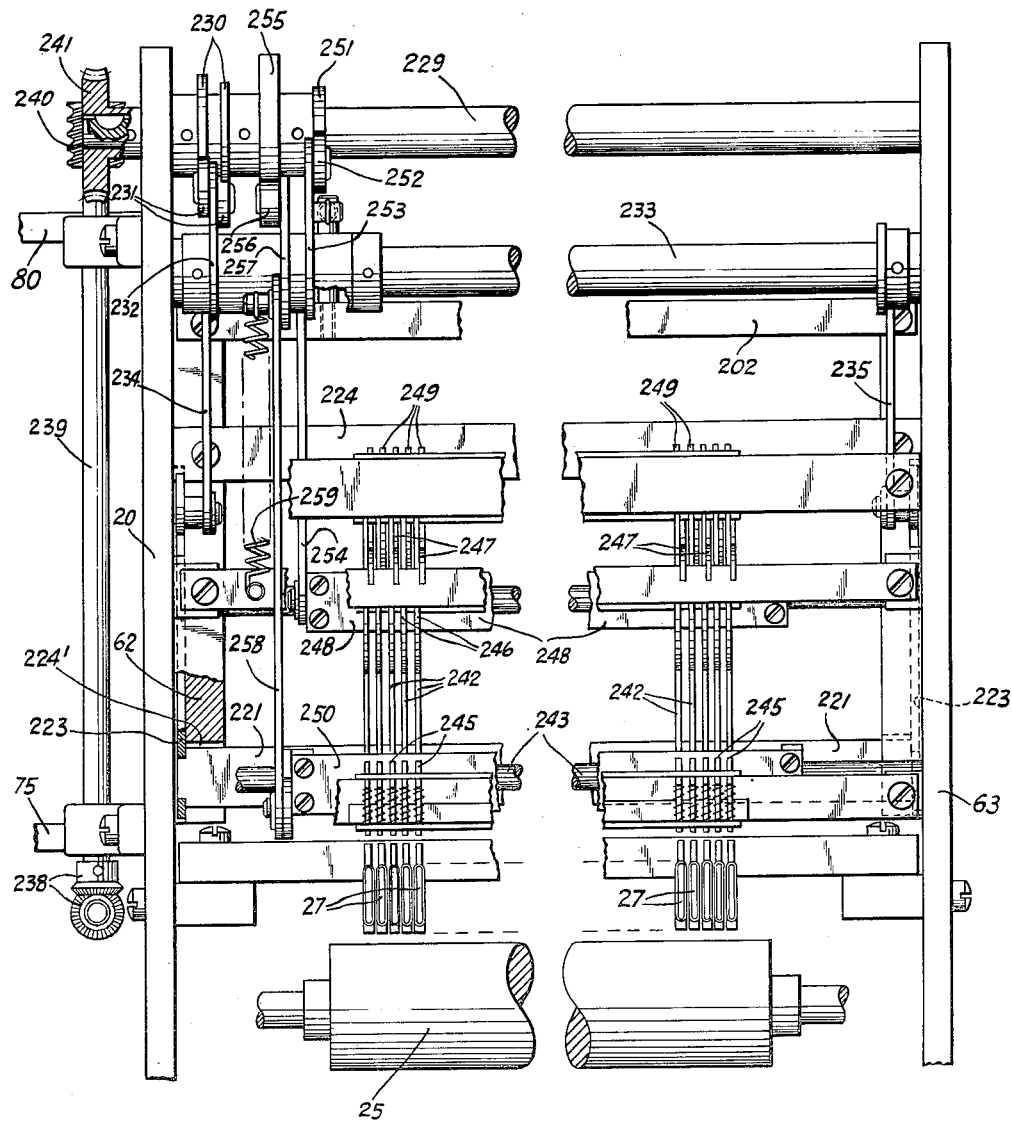

Fig. 19 is an enlarged fragmentary top plan view thereof, and

Fig. 20 is a detail view showing a fragmentary elevation, partly in section, of the type bar-control pawl releasing means.

The machine, as a whole, comprises a card feeding and analyzing section shown in Fig. 7, and a tabulating section illustrated in Fig. 8, the two sections being separated by the partition wall 20 forming a part of the main supporting frame 21 which is enclosed within the outer casing 22 of the machine. Cards are fed from a magazine 23 to a mechanical analyzer mechanism 24 which is, generally, of a type well known in the art and at which the cards are stopped while the columns thereof are simultaneously sensed for perforations designating data to be transmitted to the tabulating section for recording upon a report sheet mounted on the platen 25 of a printing mechanism of any conventional and well known type. After being analyzed, the cards are fed from the mechanism 24 into a discharge chamber 26 opening into a side of the casing 22.

With respect to the tabulating section of the machine, there are disclosed herein only mechanisms for controlling certain operations of a plurality of type bars 27 utilized to list upon the report sheet the data transmitted from the analyzer 24, and there have been omitted from the illustration such features as automatic group control, total taking and other recording devices well known in the art and which are unnecessary to a complete disclosure of the invention herein claimed, but which are capable of being built into the present machine. In connection with the type bars 27, it is to be noted that the same are, in accordance with a feature of the invention, arranged in a line which extends parallel to the direction of feed of the cards toward and through the analyzer 24. This arrangement, generally, permits of the use of one or more transfer units, such as the one illustrated in Figs. 3 to 6, forming part of the invention and employed for the transfer of data read from the cards to the recording members or type bars 27 to differentially control the latter in a greatly simplified and direct manner. Two such units 28 and 29 are herein shown, the upper unit 28 being utilized to effect selection and control of groups of the type bars while the lower unit 29 is employed for differently controlling said bars. More specifically, said transfer units are capable of easy withdrawal from and replacement in the machine for the purpose of selectively positioning therein a plurality of displaceable transfer elements in the form of pins 30 for the upper unit and pins 31 for the lower unit. The pins 30 of the upper unit make it possible to effect the arbitrary choice and control of movement of any group or groups of type bars and the assignment of any one group thereof to receive data from two or more different fields of cards being analyzed, while the pins 31 of the lower unit 29 provide for the suppression or elimination of one or more groups of type bars when no printing operation is to be performed thereby. This latter function of suppression of a group or groups of type bars is accomplished, primarily, by the provision of control holes in the cards which, in accordance with the present invention, may be arbitrarily punched in any column of a card to control any group or groups of type bars depending upon the preselected set-up of transfer pins 31 in the unit 29. Additionally, said control holes may each be punched in a column in which another index point is perforated without affecting the recording of the data represented by said index point, as will appear more clearly in the course of the description.

Figure 1:
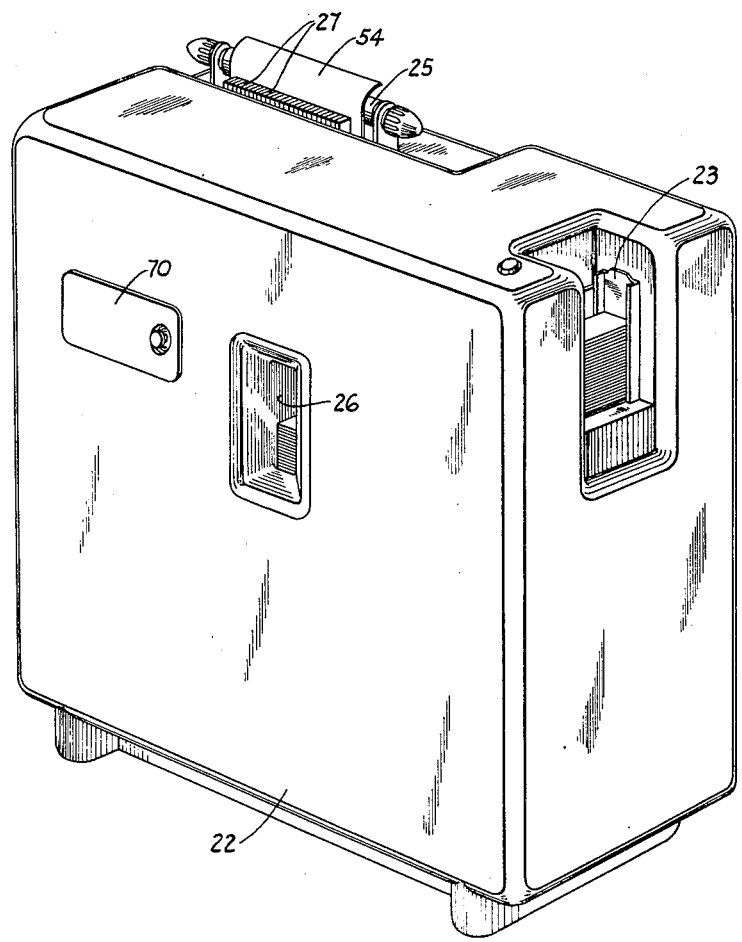
Fig. 1 is a perspective view of the machine constructed in accordance with the invention.
Figure 2:
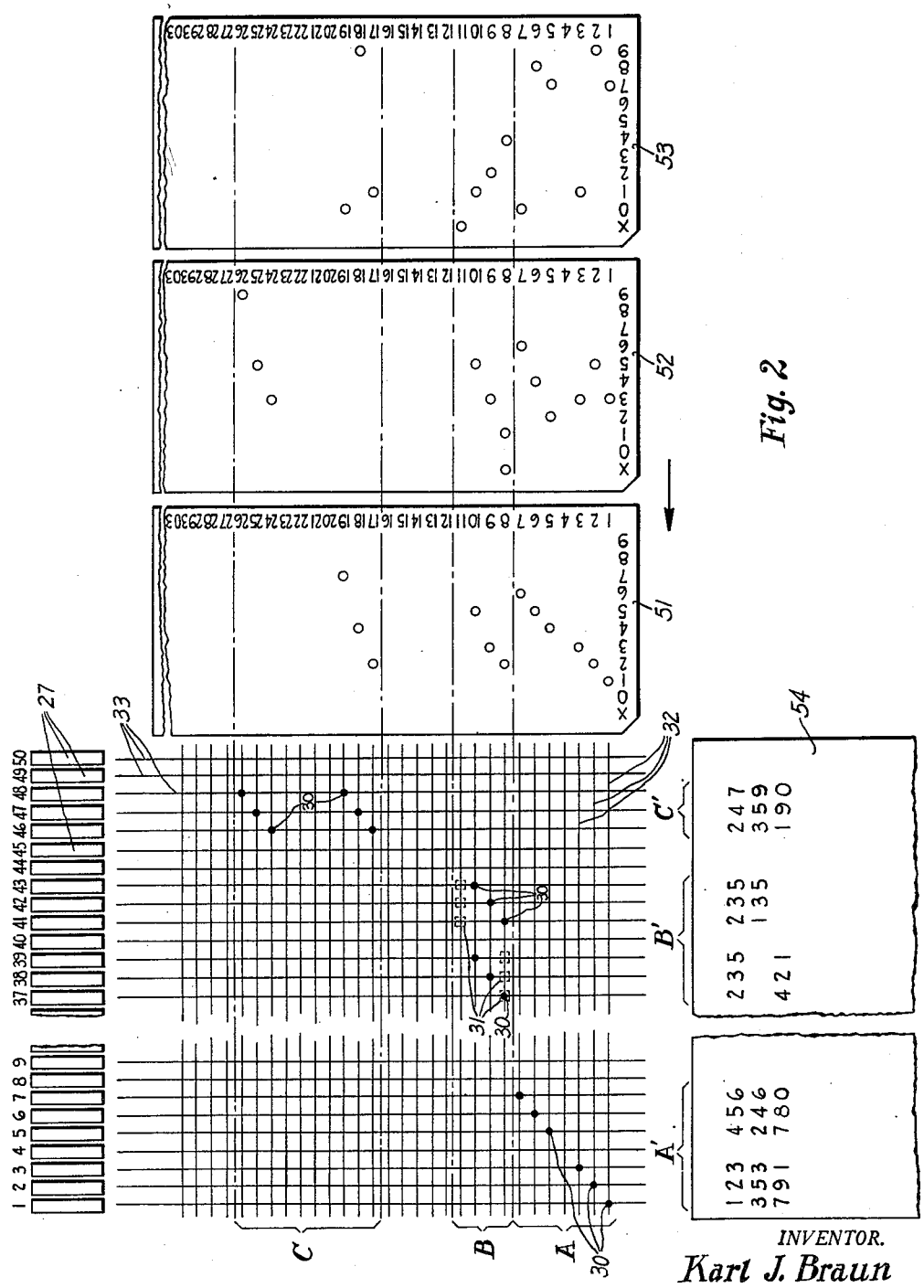
Fig. 2 is a view illustrating, diagrammatically, the manner in which data from punched cards is transmitted to recording members, such as type bars, by the use of one or more transfer units and associated mechanisms, several examples of type bar control being shown.
Figure 3:
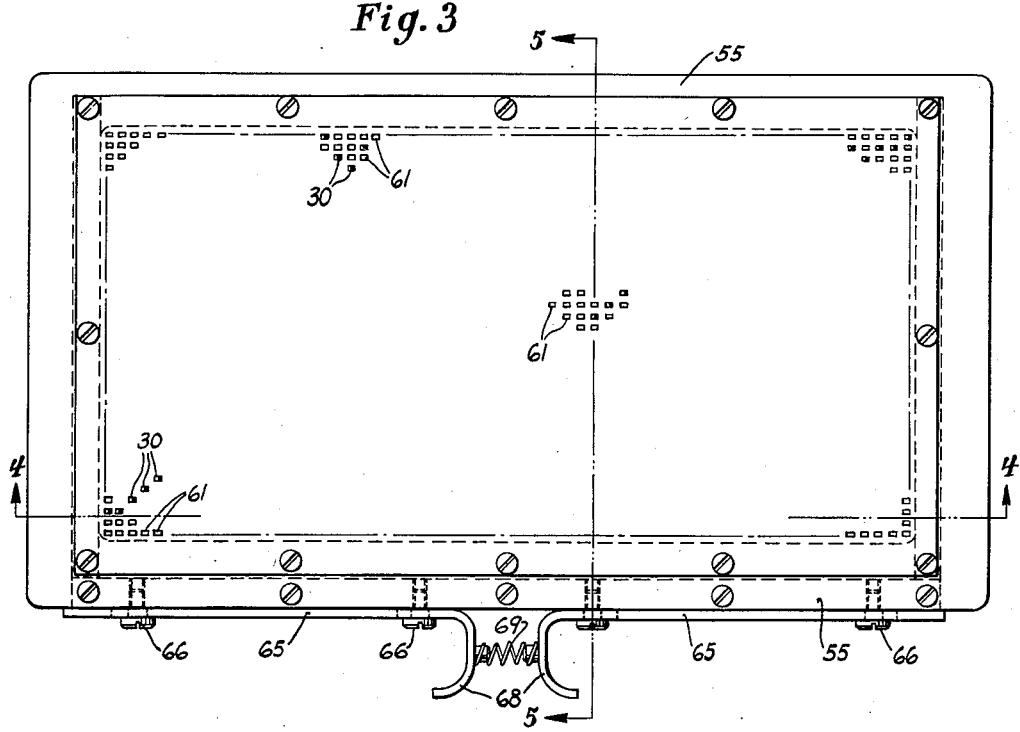
Fig. 3 is a plan view of one of the transfer units.
Figure 4:
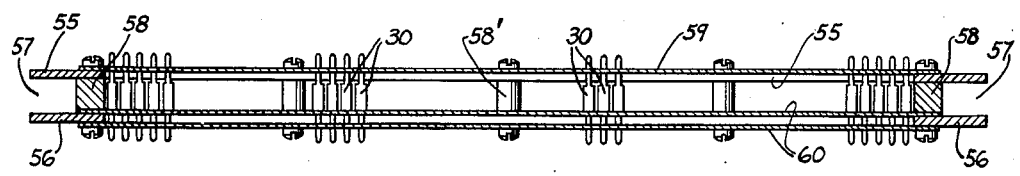
Fig. 4 is a longitudinal section on the line 4—4 of Fig. 3.
Figure 6:
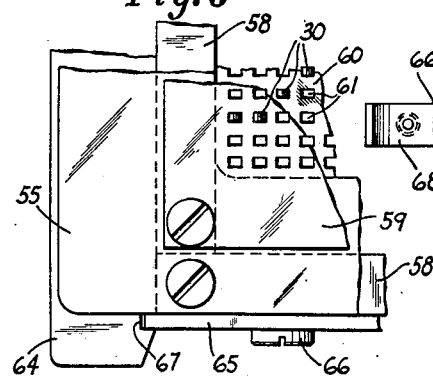
Fig. 6 is an enlarged fragmentary plan view of the unit, partly broken away, and showing the manner in which the unit is releasably retained in position in the machine.
Figure 5:
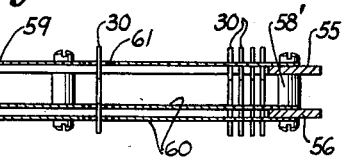
Fig. 5 is a transverse section on the line 5—5 of Fig. 3.

Reference is now made to Fig. 2 which shows, diagrammatically, the relationship of the card feed and type bars and the manner in which the transfer units are used to establish operative connections between the analyzer 24 and said type bars, only the upper unit 28 being shown and it being understood that the lower unit is directly beneath. Also, it is to be noted from said figure that the transfer pins 30 of the upper unit are shown therein as dots, while the pins 31 of the lower unit are represented by dotted line squares. In cooperation with the upper unit 28, there is employed a cross bar arrangement in which a lower set of actuating bars 32 for the transfer pins 30 of said unit, operable by an analyzer-controlled mechanism to be described and each individual to a column of the cards, extend parallel to the line of type bars 27 and in the direction of feed of the cards, while an upper set of control bars 33, operated by said transfer pins and each assigned to one of the type bars for controlling the same, is arranged transversely to the bars 32 so that the planes of intersection of said sets of upper and lower bars define junction points at which the aforesaid transfer pins are selectively positioned in order to establish operative connection between bars of the two sets. Similarly, as better shown in Fig. 17, the lower unit 29 has associated therewith the sets of actuating and control bars 34 and 35, respectively, which are also analyzer-controlled, as will later appear.

For a better understanding of some of the operations capable of accomplishment by the use of either or both of the transfer units 28 and 29, such as the group selection of type bars, the suppression or elimination of said groups and the selection of different card fiields for entry of the punched data thereon into any one of said groups, there are shown in Fig. 2, by way of example, three punched cards 51, 52, and 53 which are fed in the direction of the arrow while in the process of being analyzed, this direction of feed being parallel to the line of type bars 27. The lower actuating bars 32 associated with the upper unit 28, and which are analyzer-controlled as will later appear, are each aligned with the individual to one column of the cards, as are the similar bars 34 (Fig. 17) of the lower transfer unit 29; while the upper contrl bars 33 and 35 of both units, one for each of the type bars 27 and operated by the pins 30 and 31, are in crossed relation to the bars 32 and 34, respectively. Thus, as previously mentioned, the planes of intersection of said bars define junction points at which the pins 30 and 31 of the transfer units are interchangeably settable in accordance with a predetermined set-up to be made on the report sheet 54 which, in actual practice, is located on the platen 25 adjacent the type bars 27 but is shown remote therefrom for convenience in illustration.

To describe the operation of selecting groups of type bars for entry of data upon the sheet 54, a field of the cards, designated by the letter A and defined by dot and dash lines, has been allotted and includes the first seven columns of said cards and the actuating bars 32 individual thereto, and corresponding columns on the sheet 54 identified as the field A' have been assigned for the recording of the data read from the columns of the cards included in group A. It is further assumed that the group of type bars including those numbered 1, 2 and 3 are to be utilized to print the data appearing in the first three columns of the cards, and that the group of type bars numbered 5, 6 and 7 are to be assigned for the recording of data punched in columns 5, 6 and 7 of field A. Only the upper transfer unit 28 is required for this operation and with said unit removed from the machine, pins 30 are set at the junctions in said unit defining the points of intersection of the six pairs of crossed bars 32, 33 individual, respectively, to the mentioned card columns and groups of type bars. With the transfer unit then replaced in the machine and the latter operating to successively analyze the cards, the bars 32 will be actuated and, wherever pins 30 appear, the associated crossed bars 33 will be operated to control mechanism which governs the extent of movements of the type bars individual to said bars 33 to thereby effect the printing on the sheet 54 of the numerals or other characters corresponding to the punched index point positions in said cards. Thus, with punched index points 1, 2 and 3 of card 51, points 3, 5 and 3 of card 52 and points 7, 9 and 1 of card 53, all in the first three columns of said cards, being successively analyzed, the bars 32 aligned with said columns are actuated, upon each analysis, to operate, through the pins 30 engaged with said bars, the three cross bars 33 appearing at the extreme left of Fig. 2. These latter bars then control the movements of the type bars 1, 2 and 3 so that they will print the numbers 123, 353 and 791 appearing in the first three columns of field A' of the report sheet 54. From the foregoing, it will be apparent how the data read from the other columns of the cards included in field A is transmitted through the transfer unit to the group of type bars for 5, 6 and 7 when an ordinary listing operation is being performed. It will be further obvious that the listing just described may, if desired, be repeated on any other portion of the sheet 54 by the simple expedient of preliminarily positioning three other pins 30 in the transfer unit at the junction points of the three lower bars 32 with three other bars 33 individual to any other group of type bars.

In the illustration, field B of the bars 32 and column 8 to 11 of the cards have been allotted for the purpose of explaining the operation of type bar group selection and elimination, and field B' on the sheet 54 shows the result of this operation. In this instance, both the upper and lower transfer units 28 and 29 are employed and the control or X holes appearing in the cards are utilized to control the type bars. First, the unit 28 is set up by placing pins 30, as above described, for the card columns 8 to 11, and their corresponding bars 32 so that in the ordinary listing operation in which no X hole appears, as in card 51, the two groups of type bars 37 to 39 and 41 to 43, in the example shown, will be caused to print the number 235, read from said card 51, in both columns of field B' on the sheet 54. Proceeding with the example shown, the second and third cards 52 and 53 have control holes punched in columns 8 and 11, respectively. These control holes are for the purpose of effecting elimination of groups of type bars, depending upon the location of pins 31 in the lower transfer unit 29. Thus, for card 52, the set-up has been made to suppress the group of type bars 37 to 39 so that the data appearing on said card (#135) will not be printed in the first column of the field B' of sheet 54, while said number will be printed in the second column of said field by the group of type bars 41 to 43. This result is accomplished by placing pins 31 in the lower unit at the junction points defined by the lower bar 34, assigned to column 8 in which the X hole appears, and the three upper cross bars 35 individual to the type bars 37 to 39. When said lower bar 34 is actuated by the analyzer, said control bars 35 will be simultaneously operated by the pins 31 to suppress the operation of said type bars 37 to 39 and, at the same time, the three bars 32 of the upper unit 28 which are individual to card columns 8 to 10 will actuate the pins 30 to, in turn, operate the control bars 33 assigned to the group of type bars 41 to 43 to thus cause the printing of #135 in the second column of field B'. It will be noted that the X hole in card 52 is in the same column in which the index point 1 is punched and that pins 30 and 31 are positioned, one above the other in the two transfer units, at the points of intersection of the bars 32 and 34 of said two units with the bars 33 and 35 assigned to the type bars 37 to 39. The appearance of the two pins 30 and 31 at the same relative junction points in the two transfer units will not affect the operation of the type bars 41 to 43 in the printing of #135 in the second column of field B', since the upper unit bar 32 for column 8 of the card will, nevertheless, operate the control bars 33 assigned to the latter type bars because of the presence of the pins 30 at the junction points between said bars. On card 53, the X hole is in column 11 and #421 is to be printed in the first column of field B' and eliminated from the second column. To accomplish this, the operation of the group of type bars 41 to 43 is suppressed by placing pins 31 in the lower unit 29 at the junction points of bar 34 aligned with column 11 with the cross bars 35 assigned to said type bars so that upon operation of said bar 34, the mechanism controlled by the cross bars 35 will lock said type bars in their normal positions and prevent them from moving toward their printing positions. It will be apparent from the foregoing that any type bars may be suppressed by an X hole punched in any column of a card in any field thereof, whether or not it contains another punched index point, by the proper setting of pins 31 over the bar 34 of the lower transfer unit which is individual to the column of the card in which said X hole appears. For instance, to eliminate the group of type bars 41 to 43 in the last example given, instead of employing the bar 34 individual to card column 11, the last column of the card may have its control position punched and by placing pins 31 over the bar 34 individual to said last column and under the bars 35 assigned to said type bars, the same result is achieved as previously described.

The operation known as field selection will now be set forth. Herein, data appearing in two or more different fields of a plurality of cards is entered in the same column of the report sheet. In the example given, two different fields of the cards are indicated at C and the data on said cards is to be listed in the single column C' of the sheet 54. Only the upper transfer unit 28 is employed for this operation. Cards 51 and 53 are punched with the numbers 247 and 190, respectively, in the same field including columns 17 to 19, while the card 52 is punched with #359 in the field including columns 24 to 26 and those numbers are successively listed in the field C' to which is assigned the single group of type bars 46 to 48 and the cross bars 33 associated therewith. Placing pins 30 at the junction points defined by the intersection of the bars 32 assigned to the two card fields involved and the cross bars 33 of the selected group of type bars, causes the repeated operation of the latter bars as the cards are successively analyzed, with the result that the data on said cards is listed in the single column of the field C' on the report sheet.

Structurally, the transfer units 28 and 29 are alike, and, as shown in Figs. 3 to 6, each comprises the rectangular upper and lower spaced supporting frames 55 and 56 the opposed ends of which provide guide channels 57 for sliding the unit into position within the machine and its withdrawal therefrom, as will presently appear in more detail. Frames 55, 56 are held in spaced relation by spacer strips 58 and sleeves 58' disposed therebetween. Suitably secured on the upper frame 55 so that it may readily be removed therefrom is the top transfer pin plate 59. Also, two bottom pin plates 60 are fixed to the upper and lower surfaces of the bottom frame 56. Said plates 59 and 60 are provided with vertically aligned openings 61, the number in each vertical column being equal to the number of columns in the cards to be analyzed and each horizontal row of openings contains a number at least equal to the number of type bars 27 or other recording members such as the accumulators which may be added for total taking purposes. When preparing either unit 28 or 29 for a particular tabulating operation, the unit is withdrawn from the machine and the top plate 59 removed. Transfer pins 30 or 31, as the case may be, are then set in preselected positions in the openings 61 in the two bottom plates 60 in accordance with the data to be transmitted from the analyzed cards to the desired type bars, after which the top plate 59 is replaced with the upper and lower reduced ends of the pins projecting through and beyond the openings in the plates 59 and 60. When thus mounted, the pins are adapted for vertical movement relative to said plates under the control of the actuating bars 32 and 34 associated, respectively, with the upper and lower units. The set up unit may now be replaced in the machine and when properly positioned therein, all pins in the various horizontal rows, which are each individual to one of the card columns, will be actually in substantial alignment therewith, although this latter condition is not essential to the proper operation of the pins. Likewise, each pin appearing in any one of the vertical columns of openings 61 will be individual to and aligned with one of the type bars 27. Further, the extremities of the pins of unit 28 will be in contact with the lower actuating bars 32 and the upper control bars 33 associated with said unit, while the pins 31 of the lower unit will also contact the actuating and control bars 34 and 35 so that movement of said actuating bars in the two units will transmit movement to the control bars through the transfer pins.

The construction and assembly of the transfer units and their preparation for performing any particular job is of such a simple nature that any experienced operator of tabulating machines could repeatedly make different set ups in the units for tabulating operations of various characters, thus avoiding the necessity of having factory prepared units or special maintenance service whenever the character of an operation is to be altered.

To support and retain the units 28 and 29 within the tabulating section of the machine there is provided for each unit a pair of opposed horizontal rails 62 (Fig. 8) secured to the intermediate wall 20 of the machine frame and the end wall 63 thereof so that they extend transversely of the machine, and each rail has attached thereto a track 64 for engagement in one of the channels 57 of said unit. The means for retaining the unit in its operative position comprises two sliding lock plates 65 mounted, by means of shouldered screws 66 threaded into the front spacer strip 58, for inward and outward movement longitudinally of the front face of the unit, with the outer extremities of said locking plates engageable in notches 67 adjacent the outer ends of the tracks 64. The inner ends of said plates 65 are provided with finger pieces 68 by means of which the plates may be withdrawn inwardly toward each other to release them from the tracks 64 preliminary to withdrawing the unit from the machine. An expansion spring 69 interposed between the finger pieces 68 normally maintains the locking plates in operative position.

A door 70, or other closure member, may be provided in the front wall of the main casing 22 to permit the insertion of the units 28 and 29 into the machine and their withdrawal therefrom.

*Card feed*

As shown in Fig. 10, the machine is driven by a suitable means such as the motor 71 coupled to the primary shaft 72 through the pulley 73 and clutch 74 which may be of any conventional design. Said shaft extends along the rear wall 75 of the main frame 21 and has a worm 76 thereon which drives the gear 77 keyed on the cam shaft 78 (Fig. 11) rotatable in bearings 79 in the rear and front walls 75 and 80 and operable to control the various functions of the analyzer section, as will appear in the course of the description.

The cards stacked in the magazine 23 are fed therefrom by the reciprocating picker 81 operated by the crank connection 82 secured on the rock shaft 83 which, through the crank 84, is connected to one end of the link 85 the other end of which is secured to the bell crank 86 having a follower thereon engaging with the cam 87 on the shaft 78. As cards pass from the magazine, they are carried along by the pairs of feed rollers 88 into the card chamber 89 of the analyzer unit 24 where they are stopped for analysis of the designating data thereon and thereafter fed from the analyzer by the rollers 90 and finally discharged into the compartment 26 by the rollers 91. To drive the feed rollers 88 (Fig. 11) nearest the analyzer unit 24, the lower roller of said pair has its shaft geared to the worm 76 and carries a spur gear 92 thereon which meshes with a similar gear 93 on the shaft of the upper roller. The rollers of the other pairs 88 are similarly geared to each other and also to the shaft 72 by worms 94 (Fig. 10). The shaft of the lower roller of the first mentioned pair extends through the front wall 80 (Fig. 11) and carries a gear 95 that meshes with a worm 96 on the secondary drive shaft 97 suitably mounted in bearings on said front wall, and said shaft 97 may carry worms 98 (Fig. 9) as additional drives for the lower rollers 88 of the three pairs next adjacent the analyzing unit. The sets of rollers 90 within the analyzer unit, which are of narrow width and engage only the ends of the cards and whose shafts do not extend all the way across from wall 75 to wall 80, are driven from the shaft 72 by worms 99 (Fig. 10), and from the shaft 97 by worms (not shown) similar to the worms 98 on the latter shaft. Finally, the discharge rollers 91 are coupled together the same as the pair of shafts shown in Fig. 11 and are driven by the worm 100 on said shaft 72.

*Analyzer unit*

The unit 24 is, generally, of a construction well known in the art and comprises a lower, vertically reciprocating pin box 101 located below the card chamber 89 and containing a plurality of sensing pins 102, one for each index point on the cards to be analyzed. The box 101 is mounted on a casting 103 and is guided in its vertical movements by the connected sleeves 104 slideable on standards 105 mounted upon the base of the frame 21. To reciprocate the pin box, the shaft 78 has secured thereto the eccentric 106 which is coupled at 107' to the connection between said sleeves 104.

The unit 24 further comprises a stationary upper pin box 107 disposed above the card chamber 89 and having upper and lower plates 108 and 109 in which are slideably mounted for vertical movement the analyzing pins 110 the upper ends of which normally project above the plate 108. Similarly mounted in said upper box 107 is a group of control pins 111 shorter than the pins 110 and each assigned to one column of a card and utilized in connection with the control or X position at the head of each column. Each control pin is provided with a lateral extension 112 which projects through the adjacent wall of the pin box and is utilized, as will later appear in more detail, to control the actuation of one of the bars 34 associated with the lower transfer unit 29, previously described. All of the pins 110, 111 are vertically aligned with corresponding sensing pins 102 in the lower pin box and each column of said pins 110, 111 has associated therewith a lock plate 113 having its ends slideably mounted in and projecting through the walls of the pin box 107. Each plate 113 is provided therein with a series of L-slots 114, one for each of the pins 110 in the associated column, and a U-slot 115 for the single control pin 111 in said column, and each of said pins has a stud 116 projecting into its respective slot. The extent of sliding movement of the lock plate 113 is variable. If only a pin 110 of any one column is elevated by its associated sensing pin 102, the stud 116 on said pin 110, after being raised, will enter the short leg of its L-slot upon movement of said lock plate and will thus confine said movement to its shorter distance, and the same is true if the control pin 111 is raised along with said pin 110. However, if only the control pin 111 is elevated, its stud 116 will enter the long leg of the U-slot 115 and thus permit the plate 113 to move a greater distance to the right. The control of said lock plate and the results of its variable movements will appear in the course of the description.

As a card enters the chamber 89 preparatory to being analyzed by the upward movement of the lower pin box 101, a vertically movable card stop 117 is in its lower operative position, as shown in the drawings, so as to be engaged by the leading edge of the card which is thus brought to a temporary standstill while the pins 102 sense the card for perforations in the various columns thereof. Immediately upon retraction of said sensing pins, the card stop 117 is raised to permit the rollers 90 to feed said card from the analyzer unit to the discharge rollers 91. As best shown in Figs. 12 and 13, the mechanism for operating the card stop 117 is controlled from a cam 118 on the shaft 78 which becomes effective, immediately upon retraction of the sensing pins 102 from the card chamber 89, to rock the lever 119 about its pivot to exert a downward pull upon the link 120 against the tension of the spring 121 connected to said lever. The upper end of the link 120 is connected to a crank arm 122 mounted upon a rock shaft 123 having bearings in the upper side plates 126 secured to and forming part of walls 75 and 80. Two other crank arms 124 are secured on said rock shaft and have connected to their lower ends the links 125 which extend to the left and are guided for sliding movement by plates 127 (see Fig. 11) forming walls of the upper pin box 107 and secured to castings thereof. The left ends of said links 125 project through the left hand wall of said upper pin box and are provided with diagonal slots 128 each receiving a pin 129 carried by a bracket formed on the vertically slideable plate 130 mounted upon the adjacent wall of said pin box. Through the linkage just described, it will be apparent that when the cam 118 becomes effective to rock the lever 119, a leftward sliding movement will be imparted to the links 125 with the result that the pins 129 will ride upwardly in their respective slots so as to elevate the plate 130 and thus raise the card stop 117 carried thereby, whereupon the rollers 90 become effective to feed the analyzed card from the chamber 89 following which the card stop again returns to its normal position.

The variably movable lock plates 113 for the analyzing and control pins 110, 111 are under the dual control of a plurality of spring-urged bell crank levers 131 (see Fig. 14), one for each lock plate, and the common bail 132. Said bail is moved to the right, as viewed in Figs. 7 and 9, immediately following the elevation of any of the pins 110, 111, and when said bail is thus operated the levers 131 are rocked counter-clockwise by their springs to cause their lower ends to move the respective lock plates 113 to the right a variable distance depending upon which of the pins 110, 111 has been raised. The studs 116 of the elevated pins will enter the upper portions of their respective slots 114, 115 and the pins will thus be locked in their raised positions preparatory to controlling two different mechanisms which, in turn, control the transmission of analyzed data to the transfer units 28 and 29, as will later appear. Said bail 132 is carried by two slides 133 arranged alongside of the links 125 and guided by the plates 127 (Fig. 11). The right ends of said slides 133 are connected to the crank arms 134 secured on the rock shaft 135 having bearings in the side plates 126. Said shaft is further provided with another crank arm 136 to which is connected the upper end of the downwardly extending link 137 (Fig. 14) the lower end of which is joined to the bell crank lever 138 controlled by the cam 139 on the shaft 78. In the cyclic operation of the machine, cam 139 maintains the bail in its right hand position until the data on the cards has been transmitted to the transfer units 28, 29, whereupon said bail is restored to shift the lock plates 113 and levers 131 to their normal positions. This action of the lock plates releases the pins 110, 111 which then restore to await the next analyzing operation.

Analyzer scanning device

The elevation and locking of a plurality of the analyzing pins 110 in the different columns of the pin box 107 is immediately followed by the initial movement of a scanning device generally indicated at 140 (Figs. 9 and 15) which continuously reciprocates over said pins. Said device is provided with a plurality of operating elements in the form of sensing pawls 141, one for each column of pins, which are adapted to contact and be raised by the locked pins in the respective columns to initiate the operation of one of the aforementioned controlled mechanisms that is associated with the upper transfer unit 28, whereby the analyzed data represented by said locked pins is transmitted to the bars 32 of said unit. Briefly, it is noted at this point that the elevation and locking of any one of the control pins 111 has no effect, because of its shorter length, upon the associated pawl 141, except when said pin is the only one in its column that is in operative position, as will later appear more clearly.

The scanning device comprises a frame consisting of side rails 142 and 143 connected by the end plates 144 to complete the frame proper. Each plate 144 is provided with a reduced extension 145 that terminates in a down turned lug 146 to which is connected the mechanism, presently to be described, for reciprocating said frame. The extension 145 projects outwardly between spaced bars 147 mounted upon the upper edges of the side plates 126 and constituting trackways in which the scanning frame moves longitudinally. Guide strips 148 are secured to the extensions 145 on opposite sides of and engage the upper bars 147 of the trackways to further guide said scanning frame and prevent lateral shifting thereof during its reciprocating movements. The lower edge of the bar 142 has secured thereto a comb 149 for guiding the pawls 141 in their pivotal movements, and said pawls are pivotally suspended from said bar by means of a bracket 150 carrying a pivot rod 151 extending through said pawls. Springs 152 (Figs. 7 and 9) connect the pawls 141 with a comb plate 153 secured to the rear face of the rail 142 so as to yieldably maintain the forward ends of the pawls in a depressed condition whereby the lower inclined edges thereof will engage the locked pins 110 as the scanning device progresses through its initial or forward movement during which said pawls will, as they are raised by said pins, operate the controlled mechanism above mentioned. The forward ends of the pawls 141 are prevented from dropping down upon the upper ends of the pins 110 by stop pins 154 (Figs. 9 and 15) on said pawls which engage with the comb 149.

The reciprocation of the scanning frame is controlled from the cam shaft 78 by means of two pairs of complementary cams 155 secured on opposite ends of said shaft (Fig. 11). On opposite sides of each pair of cams there are fulcrumed at 156 and 157 (Fig. 9) the pairs of short and long levers 158 and 159 connected by a spring controlled link 160 pivoted to the levers 158 at their upper ends, and to the levers 159 intermediate their ends. The pair of levers 158 carries a roller 161 engageable with one of the cams 155 and the levers 159 carry a roller 162 engageable with the other or complementary cam so that as the two sets of cams at opposite ends of the shaft are rotated the leverage described will be oscillated about said fulcrums 156, 157. The upper ends of the two pairs of the levers 159, on opposite sides of the machine, are connected by the links 163 to the lugs 146 of the scanning frame so that the oscillating movement of said leverage will be translated into a reciprocation of said frame. The return or secondary movement of the scanning frame restores the operating pawls 141 to their initial positions and follows the restoration of the locked pins 110 to normal when they are released by the unlocking movements of the plates 113 under the influence of the bail 132. Said secondary movement of the scanning frame is also utilized, as will presently appear, to restore the data transmitting mechanism which is operated during the primary movement of said scanner.

First analyzer controlled mechanism

This mechanism, which is utilized to transmit data from the analyzing pins 110 to the actuating bars 32 of the upper transfer unit 28, is operated by the sensing pawls 141 of the scanning device and comprises a plurality of slides 164 each individual to one of said pawls and provided along its lower forward edge with rack teeth 165 one of which is adapted to be engaged by the forward end of its pawl as the latter travels along and is elevated by one of the pins 110. The slides 164 are supported at their left ends upon the upper edge of rail 142 of the scanning frame and engage between the teeth of the comb plate 153. The forward ends of the slides 164 are supported upon a fixed bar 166 mounted between the side plates 126 and carrying a comb plate 167 for said forward ends. For each slide 164 there is provided a lever 168 pivoted intermediate its ends upon a rod 169 mounted in the extension plates 170 secured to the plates 126, and guided in its movement about said pivot by a comb 171. The forward end of each lever 168 carries a disc 172 normally engageable in a recess 173 formed in the upper edge of its slide 164, while the opposite end of said lever has a pin 174 engageable with one extremity of an operating bell crank 175 the other extremity of which contacts the adjacent end of an associated actuating bar 32 of the transfer unit 28.

In operation, as the scanning frame 140 advances and carries with it the various pawls 141, it will move relative to any particular one of the slides 164 until the pawl 141 individual to said slide is elevated by contact with one of the locked pins 110, whereupon said pawl is engaged with one of the rack teeth 165 of said slide depending upon the location of said pin in its column. Further advancement of the scanning frame carries the engaged slide with it and, as a consequence, the disc 172 of the associated lever 168 is disengaged from its recess 173, thereby elevating the right end of said lever and depressing the pin 174 at its left end so as to rock the associated bell crank 175 in a clockwise direction to thereby shift the actuating bar 32 to the left. The engagement of the pawl 141 with a tooth 165 of its slide 164 is maintained while the inclined free end of said pawl is passing over the locked pin 110, and this engagement is of sufficient duration to remove the disc 172 from its recess so that the lever 168 will be rocked, after which the pawl 141 will restore to normal under the influence of its spring 152. With the end of the forward movement of the scanning frame reached, all of the locked or operated pins 110 will have actuated their respective pawls 141 with the result that the corresponding bars 32 of the transfer unit 28 will have been shifted to the left by the associated bell cranks 175. Thereupon, the frame 140 starts its return movement and, in so doing, the rail 142 thereof will progressively engage the lips 176 formed on the left ends of the variously advanced slides 164, thus returning said slides to their normal positions at which time the discs 172 of the various levers 168 will re-enter their recesses 173 under the influence of the springs 177 (Figs 8 and 16) connected to the bars 32. Said springs shift said bars to the right to rock the associated bell cranks 175 counterclockwise and thereby elevate the left ends of the levers 168. It is during the interval between the initial operation of the bars 32 and their restoration. that the transfer unit 28 becomes effective to control the extent of movement of the various type bars 27, as will later appear in more detail.

*Second analyzer controlled mechanism*

This is the mechanism associated with the lower transfer unit 29 by means of which the latter accomplishes the suppression or elimination of type bars 27 in accordance with the selective positioning of the transfer pins 31 in said unit, and said mechanism is activated by the elevation and locking up of one or more of the control pins 111 of the upper pin box 107. It will be recalled, in connection with the description of Fig. 2, that the unit 29 is effective to suppress certain preselected type bars either when a control hole appears in the same column with another punched index point, or when said hole is punched in a column wherein no other point is perforated, as exemplified in field B of cards 52 and 53, respectively. In the former event, the elevation and locking of the control pin 111 assigned to the particular column under consideration will not interfere with the usual sensing operation of the associated pawl 141 described above, and the latter will therefore move to engage the locked pin 110 in said column and thus operate the slide 164 with the results already set forth. This operation of the pawl is possible because of the fact that the associated lock plate 113 is permitted to move only a limited distance due to the entrance of the stud 116 on the then locked pin 110 into the short leg of the L-slot 114 in said plate. However, when only a control hole is punched in a column, as in card 53, and consequently only the corresponding control pin 111 is elevated, the associated lock plate 113 will be permitted to move to its extreme right hand position under the influence of its lever 131 because the stud 116 of said pin 111 will then be allowed to fully enter the long upper leg of U-slot 115 in said plate. This latter movement of the lock plate permits the associated lever 131 to rotate sufficiently for its upper end to immediately engage and raise the pawl 141 before it has started its travel to the right. Said pawl thereupon engages the first tooth 165 of its slide 164 which is then carried along by the scanning frame. In so doing, the lever 168 is rocked to actuate the associated bar 32 of the transfer unit 28 but, in the example given in card 53, no pins 30 have been set up over said bar 32 and, consequently, its actuation will have no effect upon the cross bars 33 of said transfer unit. Therefore, all the type bars, with the exception of #41, 42 and 43 which are to be suppressed by the three pins 31 in the lower unit 29, will be impelled upwardly, in a manner to later appear, until they have reached the extreme limit of their movement in which position the lowermost type in said bars will have passed beyond the hammers for operating same and, consequently, no printing operation will be effected. Assuming a condition now in which transfer pins 30 have been set over the bar 32 aligned with the column in card 53 having only a control or X hole therein, and further assuming that no transfer pins 31 are active in the lower unit 29, it will be seen that the presence of active pins 30 in the transfer unit 28 will cause the arrest of type bars to which said pins 30 have been assigned, immediately after said bars have started their upward movement, with the result that said bars will be operated to print a zero, as will be apparent from the subsequent description of the mechanism of Fig. 8. If, however, a control hole and another hole representing a significant figure appear in a card column and, again, no pins are set up in the unit 29, it will be obvious from the following description that the control hole will have no effect but that the appearance of the other hole in the card column will result in the printing of said significant figure instead of a zero, as above described.

Returning now to the point at which the control pin 111 is raised by the sensing of a hole at the X position of a card, it will be seen that as said pin starts its upward movement toward its locked position, the extension 112 thereof immediately rocks the associated spring controlled interposer lever 178 forming part of the second analyzer controlled mechanism and pivotally supported in a bracket 179 suspended from the bail 180 common to all said levers 178 and which is rockingly supported on the shaft 181 extending between the upper side plates 126. When the lever 178 is rocked, its left end is lowered to align itself with the associated actuating bar 34 of the lower transfer unit 29. Immediately upon locking of said control pin, the bail 180 is swung to the left, in a manner to presently appear, carrying all of the levers 178 with it. The left ends of those levers which have not been rocked by a control pin will pass over their respective bars 34, but the actuated lever which is now aligned with its bar 34 will shift the latter to the left to accomplish the operation of transfer unit 29 and consequent suppression of the preselected type bars. The immediate operation of said bail following the locking of control pin 111, and even before the scanning device starts its primary movement, is to enable the accomplishment of the suppression of said type bars before they start their upward travel in predetermined timed relation to the movement of said scanning device.

The bail 180 is controlled from the shaft 78 which carries a cam 182 (Fig. 11), and this cam is engaged by one end of the bell crank 183 (Fig. 9) the other end of which is pivoted to the lower extremity of a link 184 the upper end of which is connected to the crank 185 secured on the rock shaft 181. The high portion of the cam 182 causes the bell crank 183 to exert a downward pull upon the link 184 so as to rotate the shaft 181 in a clockwise direction and thus swing the interposer 178 to the left to actuate its bar 34.

*Basic type bar control*

The manner in which the actuating bars 32 and 34 of the two transfer units 28 and 29 are operated by the card analyzer has now been described. Before proceeding with the description of the results obtained by the actuation of said bars, the basic control of the type bars 27, which generally is of a conventional design, will be set forth. Said type bars are normally urged upward by spring 186 (Fig. 18) and are returned to their lowermost positions by the common restoring bail 187 which reciprocates vertically in synchronism with the action of the analyzer scanning device. The drive for said bail originates at the shaft 72 (Fig. 10) the right hand end of which extends through the wall 20 of the main framework and carries the bevel gear 189 meshing with a similar gear 190 on the upper end of the diagonal shaft 191. At the lower end of said shaft (Fig. 18) a worm 192 drives a gear 193 on the shaft 194 journaled in the walls 20 and 63 and which also carries internal cams 195 for operating the levers 196, fulcrumed at 197 and connected to the lower ends of the links 198. The upper ends of said links are joined to the brackets 199 to which the bail 187 is secured and, through this linkage and the shape of the cams 195, the bail is reciprocated in such manner that when it reaches the extreme of its upward movement it will dwell while the type are being operated to print on the sheet 54 carried on the platen 25, and will then start its return movement during which it will restore the type bars. The paper feed mechanism for the sheet 54 and the platen operating mechanism (not shown) may be of any standard construction well known in the art.

*Type bar control by upper transfer unit*

Referring now to Figs. 16 and 18, it will be seen that when any one of the actuating bars 32 is moved to the left, as viewed in Fig. 16, by the action of its associated lever 175, said bar will also be urged upwardly by the engagement of the stationary rods 200 in the diagonal recesses 201 formed in the lower edge of said bar. This coordinate movement of the bar elevates the pin or pins 30 resting thereon and each pin will thus operate the associated cross bar 33. The latter bars are supported for coordinate movements in a frame 202 (Fig. 18), under the influence of said pins 30. To produce such movements, each bar 33 is connected at spaced points to links 203 mounted upon rods 204 carried in said frame 202 so that as a pin 30 is raised it will swing its bar 33 upwardly about the pivot 204 so as to disengage its left end from the upper extremity of the associated type bar-control pawl 205. This action takes place at the instant when the proper tooth 206 of the type bar 27 is in position to be engaged by the lower extremity of the pawl 205 under the influence of its spring 207 so that said type bar will be arrested in its upward movement preparatory to the printing of the character corresponding to said tooth. The upper portion of each link 203 is provided with a notch 208 in which is engaged a pin 209 on the bar 210 which is slideable in the frame 202. A coil spring 211 at one end of the bar 210 is compressed by the action of the bar 33 just described and later acts to restore said bars 33 and 210 upon full restoration of the pawl 205 at the conclusion of the restoring movement of the type bar bail 187.

*Type bar control by lower transfer unit*

The unit 29 becomes effective when one or more of the interposer levers 178 is tripped by the associated extension 112 on a control pin 111, followed by the operation of the bail 180 and the consequent shifting to the left of one or more of the actuating bars 34 of said unit against the action of the springs 212 (Fig. 17), all of which occurs before the type bar bail 187 starts its upward movement. As a bar 34 upon which a pin 31 rests is shifted to the left, it is also raised by the engagement of the stationary rods 213 in the diagonal recesses 214 in said bar, thus elevating said pin 31 to impart a similar movement to the cross bar 35 engaged with said pin. Said bars 35, like the bars 33, are supported in a frame 215 (Fig. 18) and suspended by links 216 similar to the links 203. Like the latter, the links 216 are connected by a spring controlled bar 217 which has the same action as the bar 210. As the cross bar 35 is raised, its left end disengages from its associated type bar-control pawl 218, permitting the same, under the influence of its spring 219, to engage the tooth 220 at the lower extremity of the associated type bar 27, thus preventing said type bar from rising under the influence of its spring 186 when the bail 187 starts its upward movement.

Upon the conclusion of the printing cycle, later to be described, the restoring bail 187 starts its downward movement and carries with it all type bars which have been raised to printing position and when the latter have been restored, the bails 221 and 222 (Fig. 20), common to all the pawls 205 and 218, respectively, will operate to fully disengage said pawls from their teeth 206 and 220, and the parts will then be in position to start another cycle of operation. The bail 221 extends between and is secured to two actuating members 223 (Fig. 19) having a sliding movement on the stationary cross bar 224 the ends of which are secured to the opposed rails 62, provided with slots 224' for receiving the ends of said bail. An end of one of said members 223 is provided with a depending extension 225 utilized to couple said member with the upward extension 226 of one of the actuating members 227 for the lower bail 222, the latter members being also slideable on a fixed cross bar 228 supported in the same manner as the bar 224. Thus, sliding movement imparted to the members 223, and consequently to the bail 221, will also be transmitted to the members 227 to similarly actuate the bail 222. The members 223 and the connecting bail 221 are operated from a shaft 229 which carries the complementary cams 230 each engageable with a different follower 231 carried on the bell crank 232 mounted on the rock shaft 233. Said bell crank 232 is connected, by a link 234, to one of the bail actuating members 223 the other of which is joined, by a link 235 (Fig. 19) to said rock shaft 233.

The shaft 229 is driven from the shaft 72 (Fig. 10) by means of bevel gears 236 one of which is secured on said shaft 72 and the other carried by the lower end of a vertical shaft 237 which drives the bevel gears 238 to rotate the shaft 239 (Fig. 19) having a worm 240 thereon meshing with the gear 241 on said shaft 229.

*Printing mechanism*

This mechanism, generally, is of a construction will known in the art, and comprises a hammer 242 for each type bar pivotally mounted upon a rod 243 and urged toward its operative position by a spring 244 so that when the hammer is released it will strike a spring plunger 245 to operate the then opposed type of the associated bar 27. Each hammer 242 is normally held in its inoperative position by a sliding latch 246 which is under the control of a pivoted hammer lock-out lever 247. The latter is vertically adjustable, manually, to an inoperative position when it is desired to disable any associated hammer 242 by preventing its latch 246 from being actuated by the common operating bail 248. When a lever 247 is thus moved to a raised or inoperative position it is held thusly by a spring latch 249. In its lower or operative position, the lever 247 is adapted to be contacted by the bail 248 when the latter is swung to the right, as viewed in Fig. 18, and this contact slides the latch 246 out of the path of the hammer to permit the same to operate its plunger 245 under the influence of the spring 244. Thereupon, a common restoring bail 250 is operated to return all of the actuated hammers to their normal positions where they are reengaged by their latches 246.

The operating bail 248 is controlled from the shaft 229 which has secured thereon a cam 251 that, at the proper moment, actuates a follower 252 on one end of a bell crank 253, the other end of which is connected to a link 254 connected to said bail 248.

The restoring bail 250 is also controlled from the shaft 229 by a cam 255 thereon which engages a follower 256 on the bell crank 257 connected by link 258 to the bail 250 so as to swing the latter to the right and thus restore the hammers 242. A spring 259 connects the bell crank 257 with a stationary part of the machine so as to return the link 258 and the bail 250 to normal position after the hammers have been restored and also maintain the follower 256 in engagement with its cam.

What is claimed is:

1. In combination, a record card analyzer including analyzing elements assigned to each column of a card being analyzed and actuated by the presence of punched index points in said columns, a scanning device including an operating element for each card column actuated by the analyzing elements assigned thereto, the actuation of said operating element depending upon the position of an actuated analyzing element in said column, two transfer units each comprising a plurality of selectively positioned transfer elements, means operatively connecting one of said transfer units with said scanning device, means actuated by one of said analyzing elements for operating the other of said transfer units, a plurality of recording members, and means controlled by said transfer units for differentially controlling said recording members.

2. In combination, a record card analyzer, mechanisms controlled by said analyzer, a plurality of moveable recording members operable to record data analyzed at said analyzer, two transfer units operatively connected one to each of said controlled mechanisms and each comprising a plurality of settable transfer elements actuated by the associated controlled mechanism, a mechanism responsive to the actuation of the transfer elements of one of said units for controlling the extent of movement of said recording members, and another mechanism responsive to the actuation of the transfer elements of the other of said units for suppressing the movement of said recording elements.

3. In combination, a plurality of movable aligned recording members, a record card analyzer, means to feed cards to said analyzer in a direction parallel to the line of said recording members, data transmitting means controlled by said analyzer, a series of actuating elements operatively connected to said transmitting means and each individual to a card column and extending in the direction of feed of said cards for movement in said direction by said transmitting means, a series of movable control elements for said recording members each individual to one of them and arranged for movement transversely to said actuating elements, means including selectively positioned tranfer means operated by said actuating elements for moving said control elements in said transvesre direction, and means controlled by the movement of said control elements for arresting the movement of said recording members.

4. In combination, a record card analyzer, data transmitting means controlled by said analyzer, a plurality of aligned type bars, means to move said bars toward printing positions, a series of actuating elements each individual to a card column and extending in parallel relation to the line of said type bars for movements under the control of said transmitting means, a series of movable control elements for said type bars each individual to one of them and extending transversely to said actuating elements a transfer unit interposed between said series of actuating and control elements and including a plurality of settable pins operated by the movements of said actuating elements for imparting movements to said control elements, and means movable relative to said type bars and controlled by the movements of said control elements for differentially setting said recording members in accordance with data transmitted by said transmitting means.

5. In combination, a plurality of movable recording members, an analyzer to which record cards are fed, mechanisms controlled by said analyzer for transmitting data from cards therein, two transfer units operatively connected one to each of said controlled mechanisms and each comprising a plurality of selectively settable transfer elements, a plurality of actuating elements for each transfer unit operated by one of said controlled mechanisms for operating the settable transfer elements of the associated unit, a plurality of control elements actuated by the operation of the transfer elements of one of said units to control the extent of movements of said recording members, and a plurality of other control elements actuated by the operation of the transfer elements of the second unit to suppress the movements of said recording members.

6. The combination as claimed in claim 5, characterized by the alignment of said recording members in a single row and the movements of both sets of said actuating elements of the two transfer units in a direction parallel to said row of recording members.

7. In combination, a record card analyzer, a plurality of recording members, analyzer controlled mechanisms, a transfer unit comprising selectively positioned transfer elements for effecting selection of a group of said recording members and operatively connected to one of said controlled mechanisms to control said group of members, a second transfer unit having selectively positioned transfer elements operatively connected to the other of said controlled mechanisms for differently controlling others of said recording members, and means in said card analyzer for activating both of said controlled mechanisms when two perforations appear in the same column of a card and for operating only one of said mechanisms when but one perforation appears in said column.

8. The combination as claimed in claim 7, wherein the means in said analyzer comprises a differentially movable locking element for each column of a card being analyzed, and a plurality of analyzing pins and a control pin for controlling the movements of said locking element.

9. In combination, an analyzer for record cards which are provided with a plurality of columns each having index point designations including a control position, a plurality of recording members, a transfer unit comprising selectively positioned transfer elements for selection of different groups of recording members to be connected to predetermined columns on said cards, means controlled by said analyzer for establishing connection to said groups of recording members through said transfer unit to operate said members, a second unit comprising selectively positioned transfer elements operated through said analyzer under the influence of the control position in any one of said columns to suppress any group of said recording members, and means responsive to the operation of the transfer elements of said second unit for so suppressing said group of recording members.

10. In combination, a record card analyzer including analyzing elements assigned by groups to each column of a card and actuated by the presence of punched index points in said columns, a reciprocable scanning device movable over said analyzing elements and including a frame, a plurality of sensing pawls carried by said frame one for each group of analyzing elements for operation by an actuated element in its associated group, an analyzer controlled mechanism including a plurality of slides supported upon said frame for relative movements therebetween and also for movement therewith, each slide being associated with one of said sensing pawls and a group of said analyzing elements and being provided with rack teeth for engagement by its sensing pawl when the latter is operated by an actuated analyzing element, means to move said scanning device relative to said slides until one of them is engaged by its pawl and to then move said slide therewith, motion transmitting means operated by the movement of said slide, and a recording member responsive to the operation of said transmitting means.

11. In combination, a record card analyzer including analyzing elements assigned to each column of a card being analyzed and actuated by the presence of punched index points in said columns, a movable scanning device associated with said analyzing elements and including an operating element assigned to each card column and operated by contact with an actuated analyzing element, means to move said scanning device relative to those analyzing elements which have been actuated to effect contact between said operating and analyzing elements to operate the former, a unit comprising transfer elements under control of said operating elements, mechanism responsive to the operation of said operating elements to actuate said transfer elements, a plurality of settable recording members, and means controlled by the actuated transfer elements for controlling the setting of said recording members.

12. In combination, a record card analyzer including analyzing elements assigned by groups to each column of a card and actuated by the presence of punched index points in said columns, a scanning device movable relative to said analyzing elements and including a plurality of sensing members, one for each group of analyzing elements, each movable with said device for contact with an actuated analyzing element when sensing its associated group, an analyzer controlled mechanism including a plurality of slides, one for each sensing member, with respect to which said scanning device is relatively movable and which are also movable with said device, said slides each having means engageable by its sensing member when the latter senses an actuated analyzing element, means to move said scanning device relative to said slides until one of them is engaged by its sensing member and to then move said slide therewith, a settable recording member, and means actuated by the movement of said slide for controlling the setting of said recording member.

13. In combination, a record card analyzer, a plurality of settable recording members, analyzer controlled mechanisms, a transfer unit comprising operable elements for effecting selection of a group of said recording members, means to operatively connect said operable elements to one of said controlled mechanisms to control the setting of said group of recording members, a second transfer unit comprising operable elements operatively connected to the other of said controlled mechanisms for differently controlling others of said recording members, and means for activating both of said controlled mechanisms when two perforations appear in the same card column and for operating only one of said mechanisms when but one perforation appears in said column.

14. The combination as claimed in claim 13, wherein the last named means comprises a plurality of pins for each card column of a card being analyzed, a differentially movable locking element for said pins, and means for controlling the differential movements of said locking element.

15. In combination, a settable recording member, a card analyzer including a group of analyzing pins and a control pin assigned to a column of a card to be analyzed with each analyzing pin being operable alone or together with said control pin depending, respectively, upon the appearance of one or more holes in said card column, a movable locking element for said analyzing and control pins having means cooperating therewith to variably control the extent of movement of said element under said different conditions of operation of said analyzing and control pins, and means controlled by the variable operation of said locking element for differentially controlling the setting of said recording member.

16. In combination, card sensing means, analyzer controlled mechanisms operatively connected to said sensing means and each separately actuated by sensed holes having different positions in a card column, means to so actuate said controlled mechanisms, recording members, two transfer units each separately controlled by and individual to one of said controlled mechanisms and each comprising a plurality of transfer elements actuated by the operation of the associated controlled mechanism, and means responsive to the actuation of said transfer elements in said units for differentially controlling said recording members.

17. In a tabulator, a type bar having a plurality of teeth, an arresting pawl for engaging any one of said teeth, an analyzing mechanism including a sensing and an analyzing pin operated thereby, means to lock the latter pin in a position to which it is operated by the sensing pin, a scannnig device movable over said locked pin and including a pawl actuated by contact therewith, means to move said type bar in synchronism with said scanning unit, and means responsive to the actuation of said scanning pawl to operate said arresting pawl to engage it with a tooth of said type bar corresponding to the locked analyzing pin.

18. In combination, card sensing means, analyzer controlled mechanisms actuated thereby, recording members, two transfer untis each operatively connected to and controlled by one of said controlled mechanisms and each comprising a plurality of transfer elements positioned in operative relation to said recording members, means to operatively connect each controlled mechanism to one of said transfer units for operating the transfer elements therein, and means responsive to the operation of the positioned elements of said transfer units for differentially controlling said recording members in accordance with the actuation of said analyzer controlled mechanisms.

19. In combination, a record card analyzer including a plurality of pins operable when holes are sensed in a card, mechanisms each separately controlled by different operated pins in said analyzer, two transfer units each operatively connected to one of said controlled mechanisms and each comprising a plurality of transfer elements, means actuated by each of said controlled mechanisms for operating the transfer elements of the unit connected to said mechanism, recording members movable to recording positions, and means controlled by the operated transfer elements of said units for differentially controlling the movements of said recording members.

20. In combination, a record card analyzer including a plurality of control pins each assigned to a column of a card in which a control hole may appear, a mechanism including motion transmitting elements each individual to one of said control pins and rendered operative thereby when its pin is operated by the sensing of a control hole, means to so operate said transmitting elements, an actuating member to which motion is imparted by an operated transmitting element, a plurality of control members intersecting the plane of said actuating member, a plurality of movable type bars, one for each of said control members, transfer pins selectively settable at predetermined points of intersection of said actuating member with any group of said control members to operate the latter when motion is transmitted to said actuating member, and means controlled by the operation of said control members for suppressing the movement of the associated type bars.

21. In combination, a record card analyzer, means controlled thereby for transmitting data from cards in said analyzer, a plurality of movable actuating bars operated by said controlled means, a plurality of movable control bars arranged transversely in spaced relation to said actuating bars to define junction points therebetween, motion transmitting means operated by the movement of said actuating bars and located in the space between said actuating and control bars at said junction points for operatively connecting said bars to actuate said control bars when said actuating bars are operated, settable recording members, and means controlled by the movement of said control bars when operated by said motion transmitting means for setting said record means in recording position.

22. In a statistical card machine, the combination with actuating and control mechanisms, and recording members controlled thereby; of a transfer unit operatively associated with said actuating and control mechanisms and comprising a movable supporting frame having columns of openings therein with the openings in each column individual to one of said recording members, means to mount said frame for movements into and out of operative association with said actuating and control mechanisms, and a plurality of transfer elements movably mounted in openings in said columns for cooperation with said actuating and controlling mechanisms when said frame is in operative association with said mechanisms.

23. In a statistical card machine, the combination with actuating and control mechanisms, and recording members controlled thereby; of a transfer unit comprising spaced supporting elements having openings therein and being movable into and out of operative association with said actuating and control mechanisms, means to removably retain said supporting elements in association with said mechanisms, and a plurality of settable pins, one for each column of a card to be analyzed, mountable in openings in said supporting elements and selectively settable therein for variable association with said mechanisms when said supporting elements are moved out of operative relation to said mechanisms.

KARL J. BRAUN.

REFERENCES CITED

The following references are of record in the file of this patent:

UNITED STATES PATENTS

| Number | Name | Date |
|---|---|---|
| 1,274,484 | Williams | Aug. 6, 1918 |
| 1,333,890 | Wright | Mar. 16, 1920 |
| 2,034,104 | Lasker | Mar. 7, 1936 |
| 2,113,634 | Tauschek | Apr. 12, 1938 |
| 2,290,827 | Thomas | July 21, 1942 |
| 2,336,111 | Mayorga | Dec. 7, 1943 |

FOREIGN PATENTS

| Number | Country | Date |
|---|---|---|
| 614,956 | Germany | June 22, 1935 |
| 401,012 | Great Britain | Nov. 9, 1933 |